United States Patent
Murahara

(10) Patent No.: US 8,277,632 B2
(45) Date of Patent: Oct. 2, 2012

(54) ONSITE INTEGRATED PRODUCTION FACTORY

(75) Inventor: Masataka Murahara, Kamakura (JP)

(73) Assignee: M Hikari & Energy Laboratory Co., Ltd., Kanagawa (JP)

( * ) Notice: Subject to any disclaimer, the term of this patent is extended or adjusted under 35 U.S.C. 154(b) by 0 days.

(21) Appl. No.: 13/453,496

(22) Filed: Apr. 23, 2012

(65) Prior Publication Data
US 2012/0202279 A1   Aug. 9, 2012

Related U.S. Application Data

(60) Division of application No. 12/615,437, filed on Nov. 10, 2009, now Pat. No. 8,197,664, which is a continuation of application No. PCT/JP2008/058500, filed on May 7, 2008.

(30) Foreign Application Priority Data

May 11, 2007 (JP) ................................. 2007-126324
Mar. 27, 2008 (JP) ................................. 2008-082335

(51) Int. Cl.
    *C25B 1/34* (2006.01)
(52) U.S. Cl. ....................................... 205/516
(58) Field of Classification Search .................. 119/200, 119/215, 231; 47/1.01 R, 59 R, 62 N; 204/402, 204/404, 518; 205/408, 516
    See application file for complete search history.

(56) References Cited

U.S. PATENT DOCUMENTS 5,124,012 A   6/1992   Berleyev

FOREIGN PATENT DOCUMENTS

| EP | 0209932 | 1/1987 |
|---|---|---|
| GB | 2001374 | 1/1979 |
| JP | 54-118196 | 9/1979 |
| JP | 60-30622 A | 2/1985 |
| JP | 5-89710 | 4/1993 |
| JP | 5-135783 | 6/1993 |
| JP | 7-63155 | 3/1995 |
| JP | 7-323279 A | 12/1995 |
| JP | 11-68176 A | 3/1999 |
| JP | 11-228101 A | 8/1999 |
| JP | 2000-202441 | 7/2000 |
| JP | 2001-57816 | 3/2001 |
| JP | 2001-213388 | 8/2001 |
| JP | 2002-59893 | 2/2002 |

(Continued)

OTHER PUBLICATIONS

Greener World, greenerw.exblog.jp, Jul. 14, 2006.

(Continued)

*Primary Examiner* — Monica Williams
(74) *Attorney, Agent, or Firm* — Bacon & Thomas, PLLC

(57) ABSTRACT

An onsite integrated production factory having an electrolytic plant, an ethanol plant, a vegetable plant, a culturing plant, and a power generation unit. The onsite integrated production facility is arranged so that fresh water, sulfuric acid or caustic soda produced by and received from the electrolytic plant is used in the ethanol plant to produce and output oxalic acid, sodium oxalate, fuel bioethanol. The oxalic acid or sodium oxalate produced in and received from the ethanol plant is used for removing calcium contained in the sea water in the electrolytic plant. The vegetable plant produces vegetables for generation and outputting of oxygen by receiving the carbon dioxide generated during the fermentation process in the ethanol plant and fresh water from the electrolytic plant. The culturing plant has a fishery farm or reef for using the oxygen generated in the vegetable plant.

11 Claims, 21 Drawing Sheets

FOREIGN PATENT DOCUMENTS

| | | |
|---|---|---|
| JP | 2002-255091 | 9/2002 |
| JP | 2002-303454 | 10/2002 |
| JP | 2003-169657 | 6/2003 |
| JP | 2003-206848 | 7/2003 |
| JP | 2003-206849 | 7/2003 |
| JP | 2003-333955 | 11/2003 |
| JP | 2005270859 | 3/2004 |
| JP | 2004-290945 | 10/2004 |
| JP | 2004-296960 | 10/2004 |
| JP | 2004-344107 | 12/2004 |
| JP | 2004-537668 | 12/2004 |
| JP | 2005-52136 | 3/2005 |
| JP | 2005-69125 | 3/2005 |
| JP | 2005-126278 | 5/2005 |
| JP | 2005-145218 | 6/2005 |
| JP | 2005-270859 A | 10/2005 |
| JP | 2005-280581 | 10/2005 |
| JP | 2006-75007 A | 3/2006 |
| JP | 2006-111895 A | 4/2006 |
| JP | 2006-254900 | 9/2006 |
| JP | 2006-278352 | 10/2006 |
| JP | 2007-2721 | 1/2007 |
| KR | 100660761 | 2/2006 |

OTHER PUBLICATIONS

The Nikkei, morning paper, "All fiber components of wood chips and weeds, to ethanol", Mar. 30, 2007.

The Nikkei, evening paper, "Ebana Corporatio, will take share in bioethanol", Mar. 8, 2007.

Nippon Kokusei Zuka, Foundation, Yano Kota Kinenkai, Jun. 1, 2006.

Takahashi, Introduction to Electrochemistry, Maki Shoten, Feb. 20, 1991, New edition 4.

The Latest Chemistry of Products, (k.k.) Kokusei (sha), p. 79, Dec. 20, 1973.

Free Encyclopedia "Wikipedia", "downloadable" at http://ja/wikipedia.org/wiki/%E6%B5%B7%E6%B4%8B%E6%B7%B1%E5%B1%A4%E6%B0..., Nov. 26, 2009.

The Nikkei, third page of evening paper, "Photosynthesis by New-infrared rays / Ocean Bacteria", Apr. 10, 2007.

Murahara, Measurement of the thermal diffusivity of a rock by using a thermal semiconductor, The Nikkan Kogyo Shinbun, Mar. 30, 1997.

Toshiba Press Release, "As to the development of a heat conductive module generating electricity by utilizing a difference in temperature between the upper and lower surfaces", Mar. 29, 2004.

The Nikkei, morning paper, "Fishery regulation will be strengthened, Excitement over Culturing of Tuna", Jan. 22, 2007.

Ocean Policy Research Foundation, News Letter No. 140, Jun. 5, 2006.

International Search Report corresponding to PCT/JP2008/058500, dated Aug. 26, 2008.

The Nikkei, front page of morning paper, "Water-making is spread worldwide", Jan. 14, 2007.

Supplemental Search Report of EPO corresponding to European Patent Application 08752392.4-1260, dated Jun. 28, 2011.

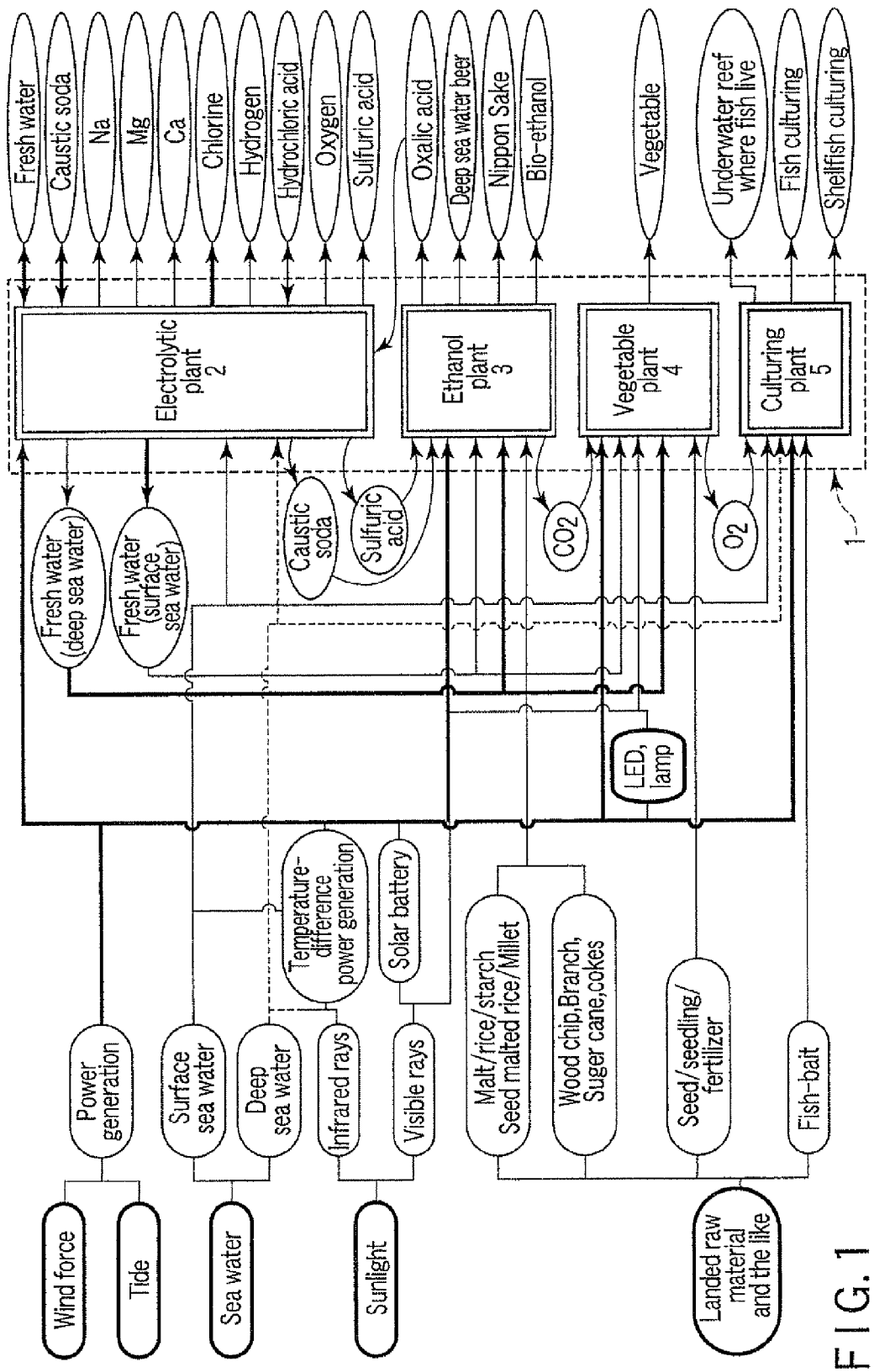
F I G. 1

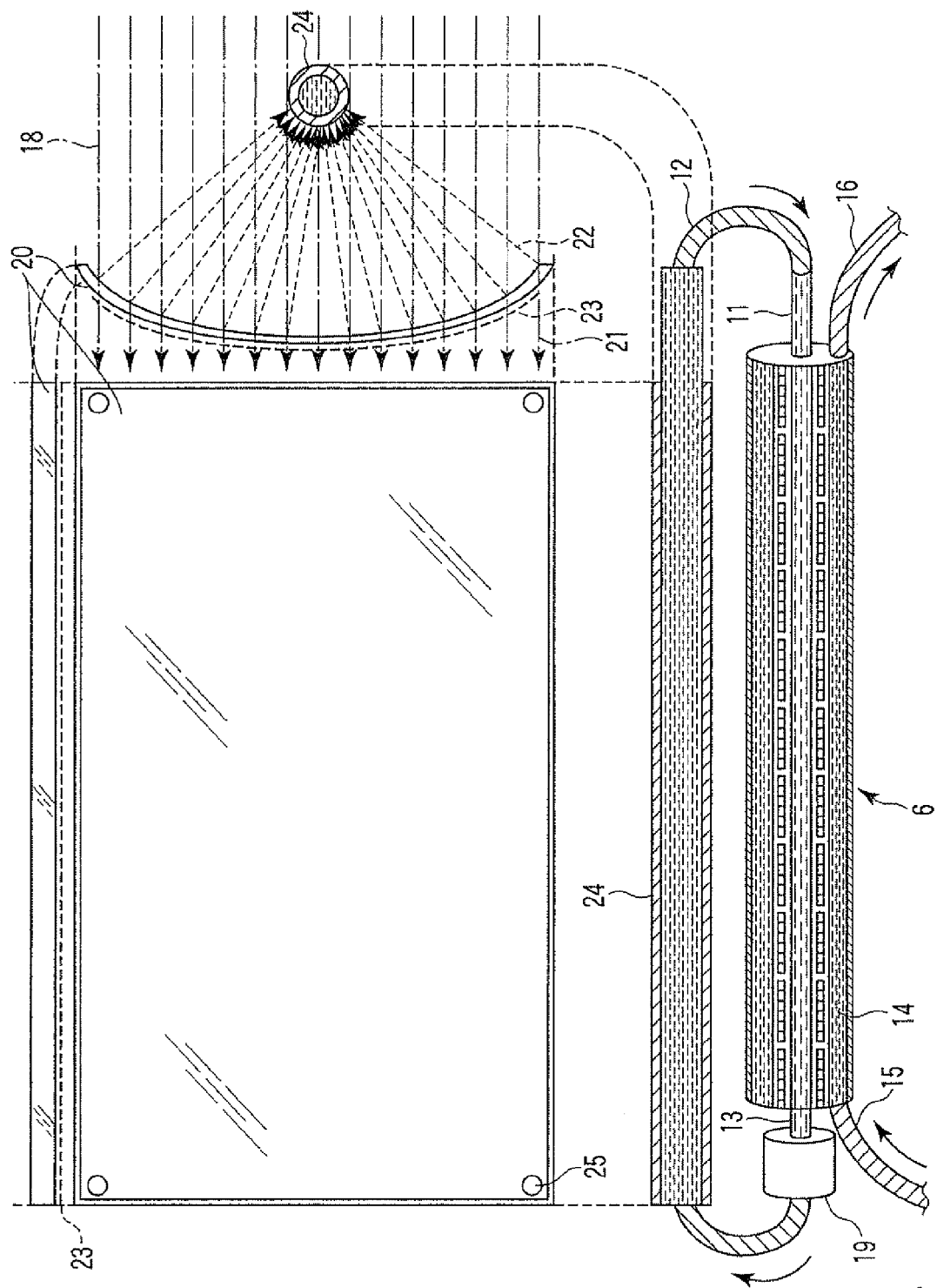
F I G. 4

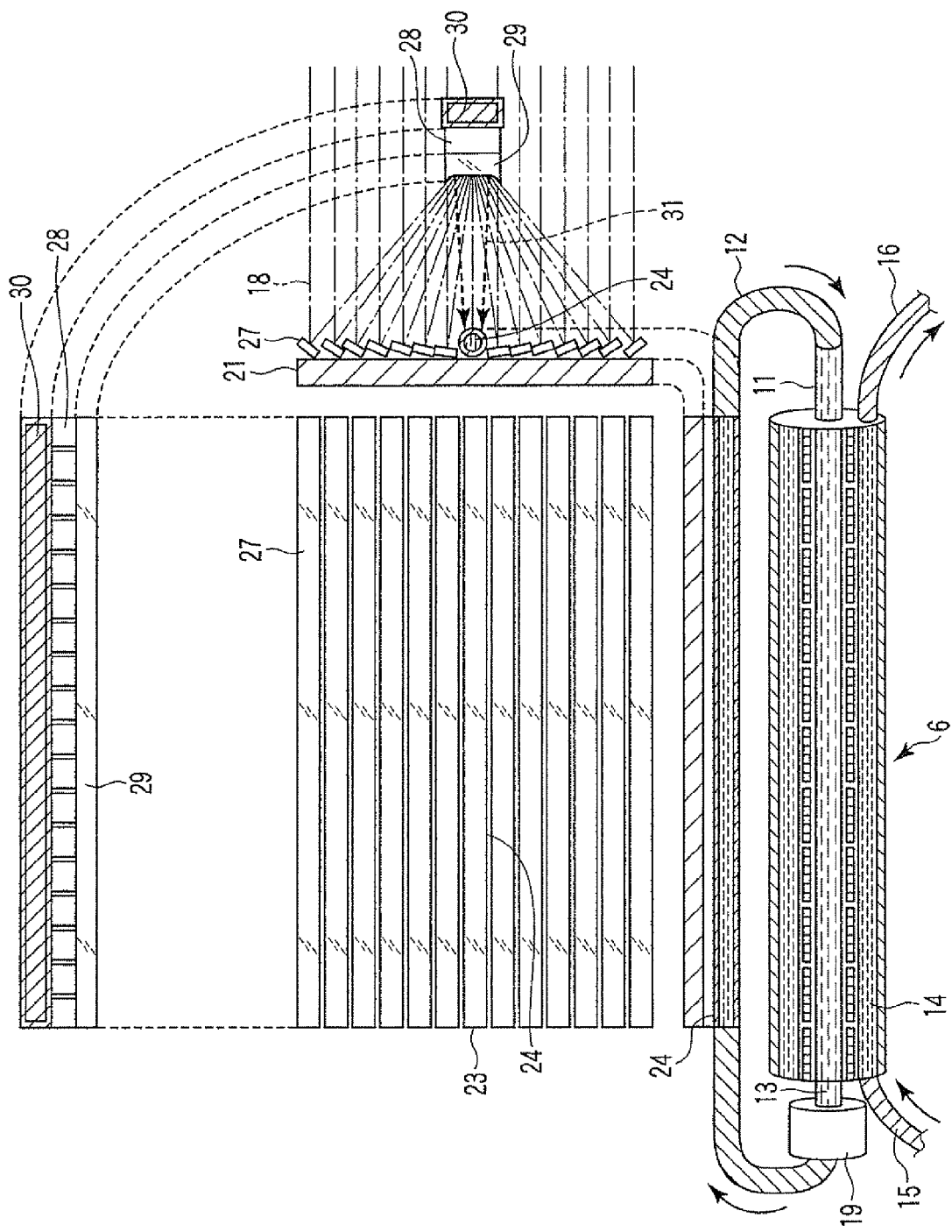
F I G. 5

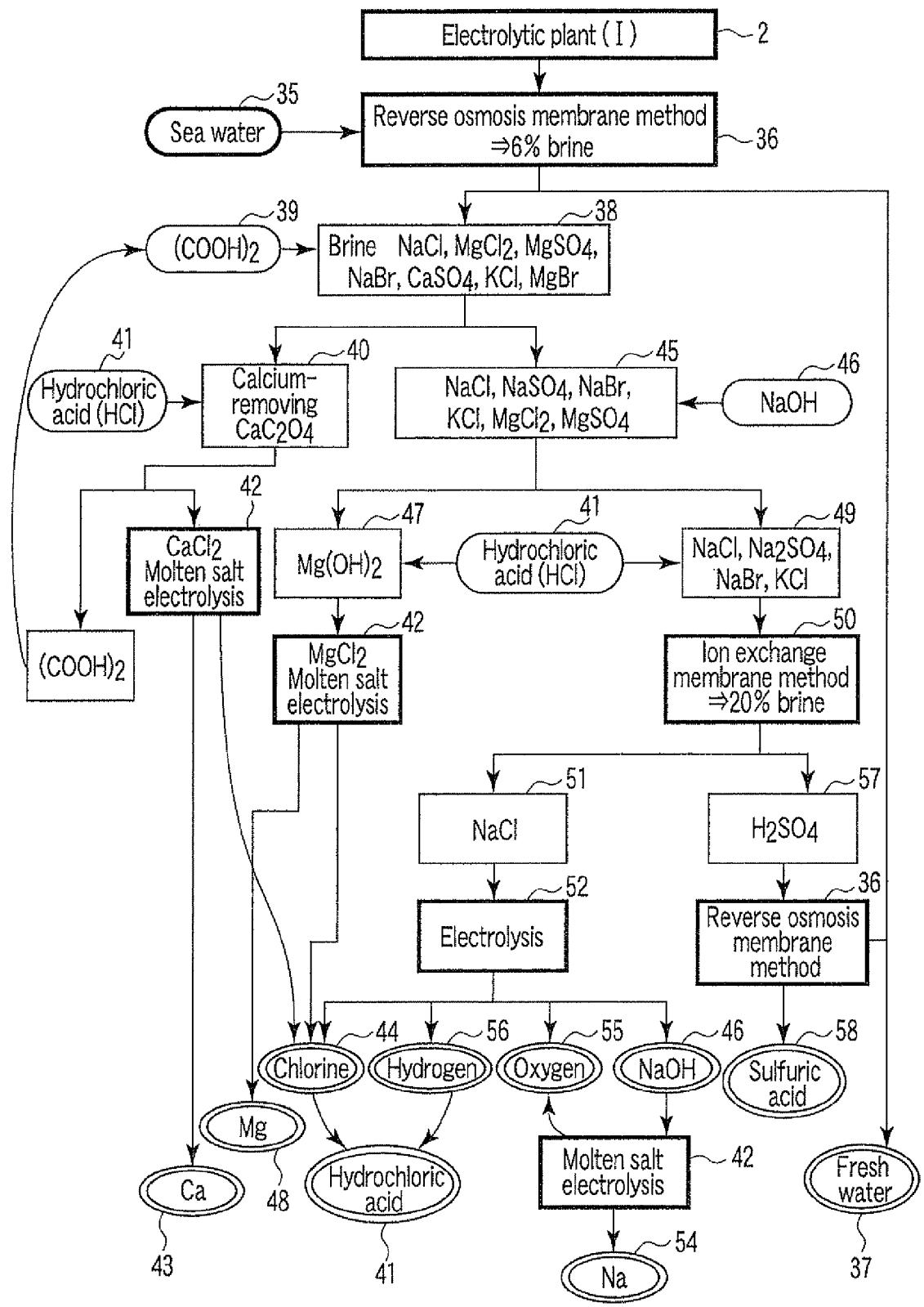
F I G. 7

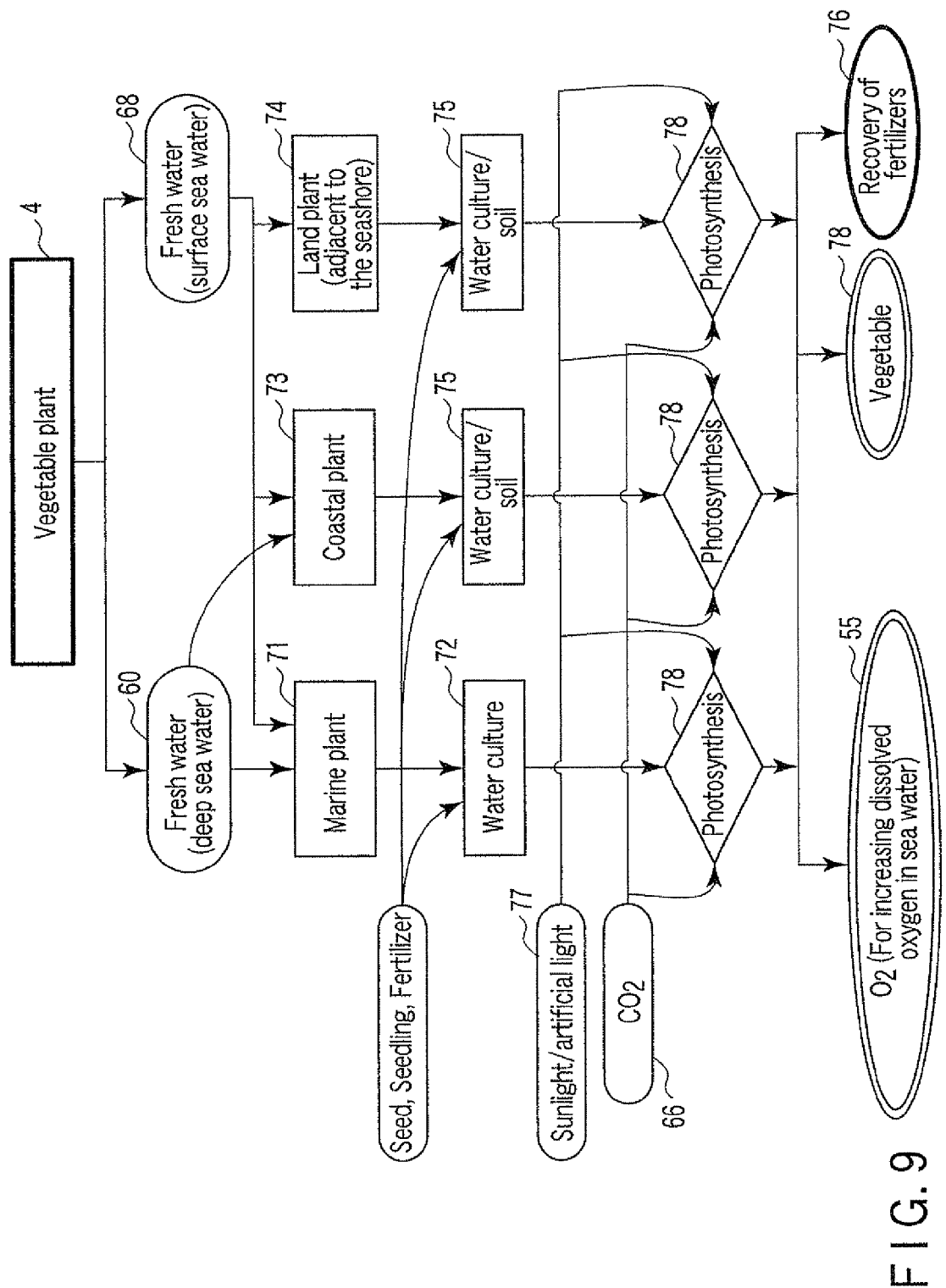
F I G. 9

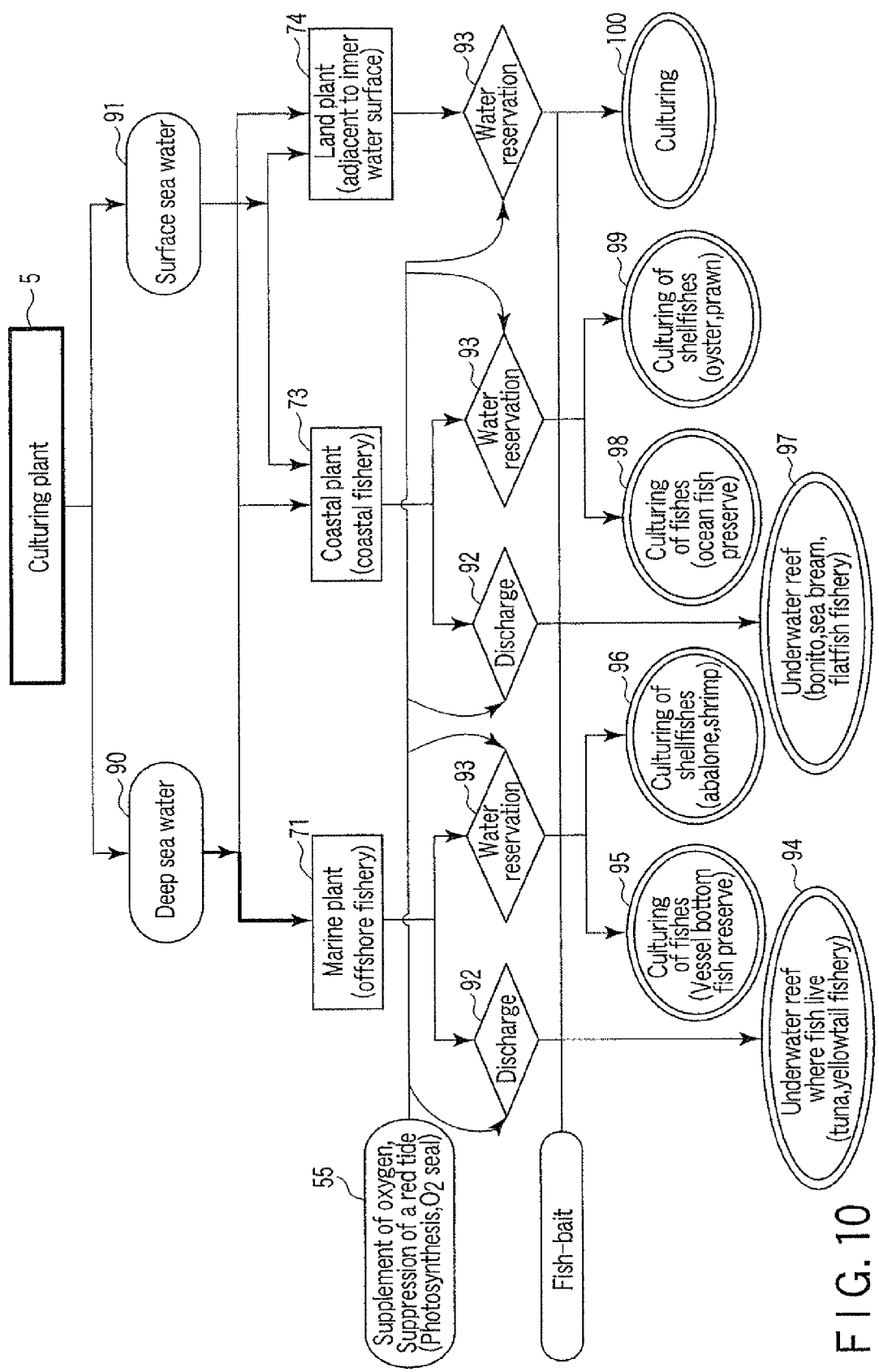
F I G. 10

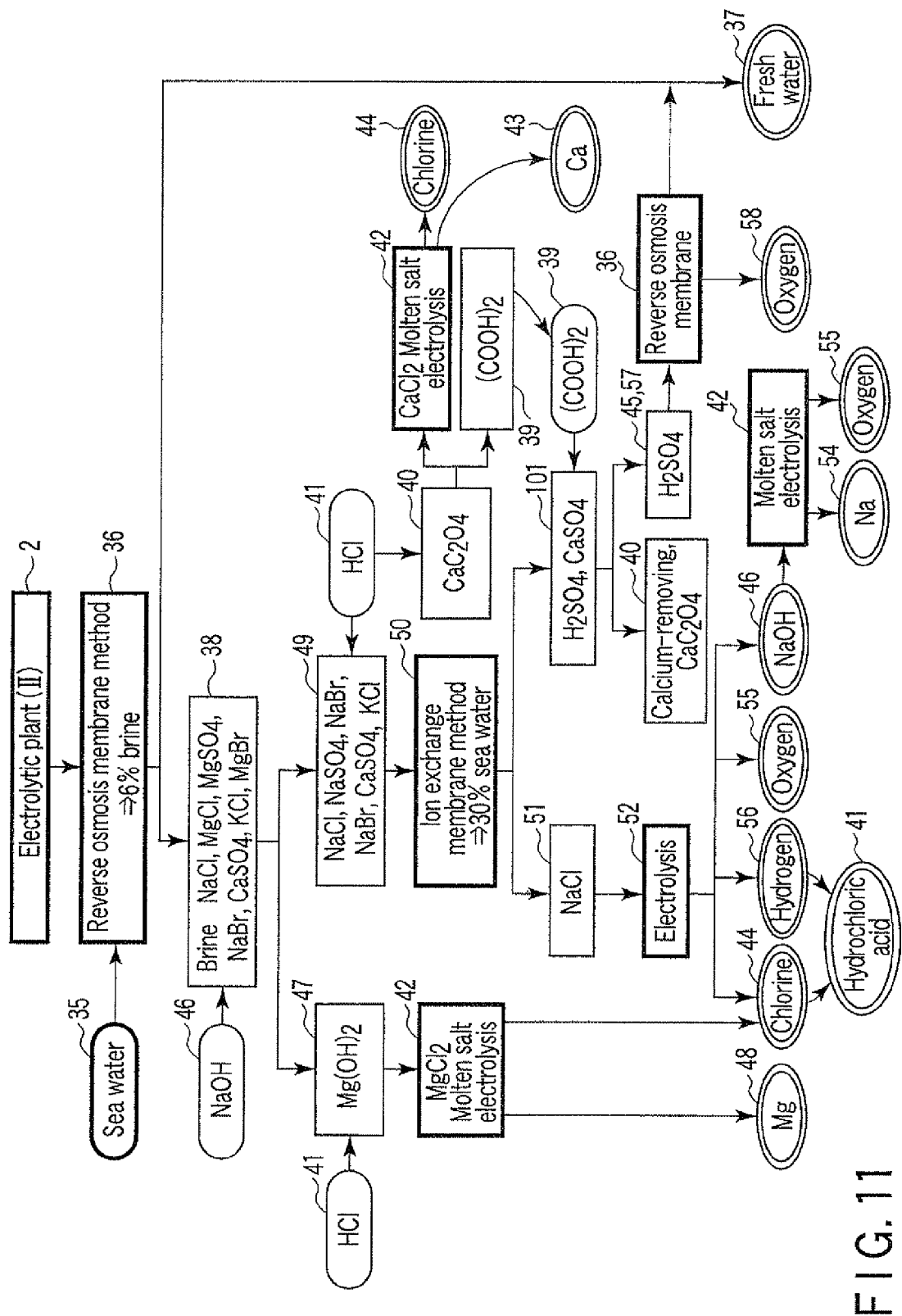
F I G. 11

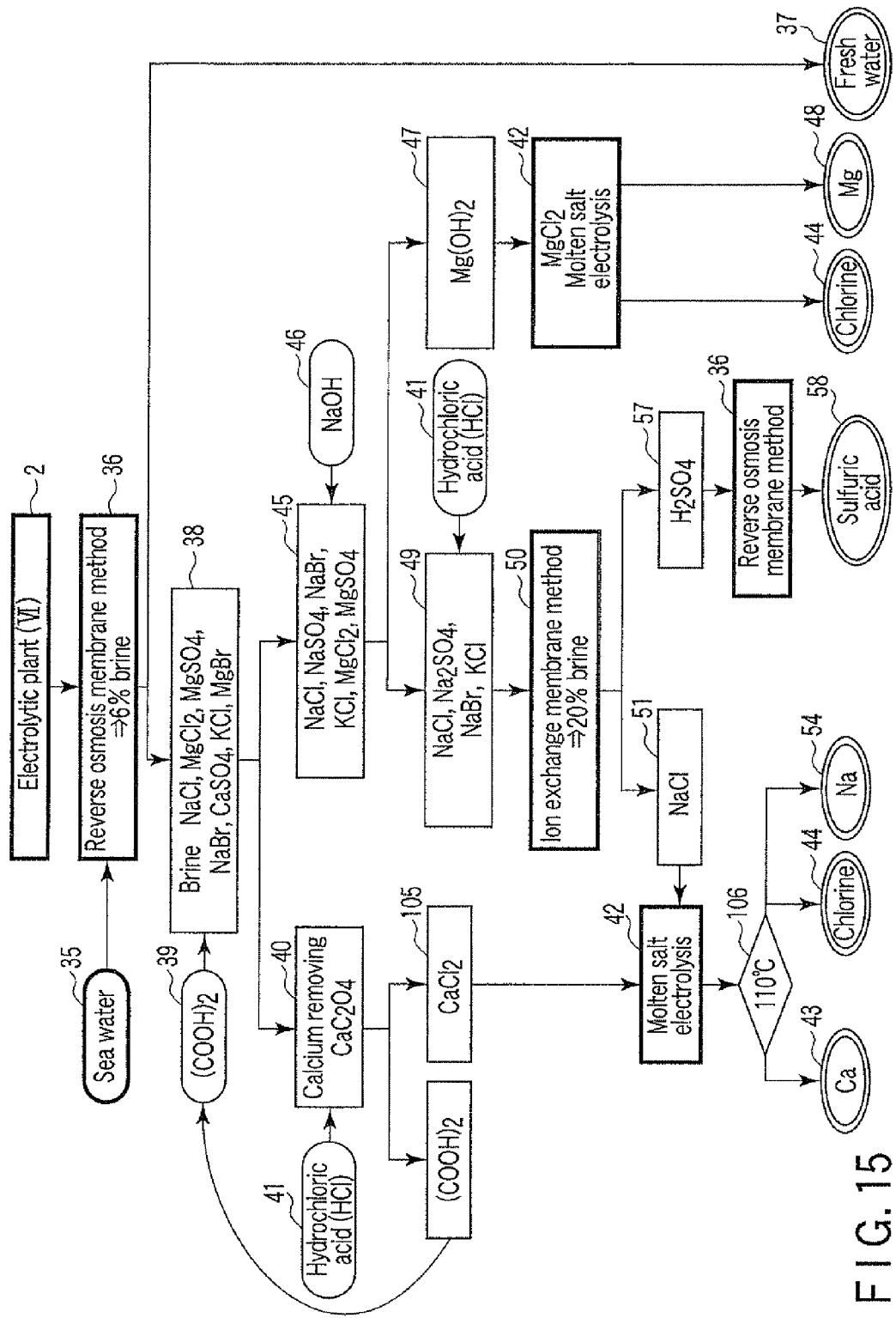
F I G. 15

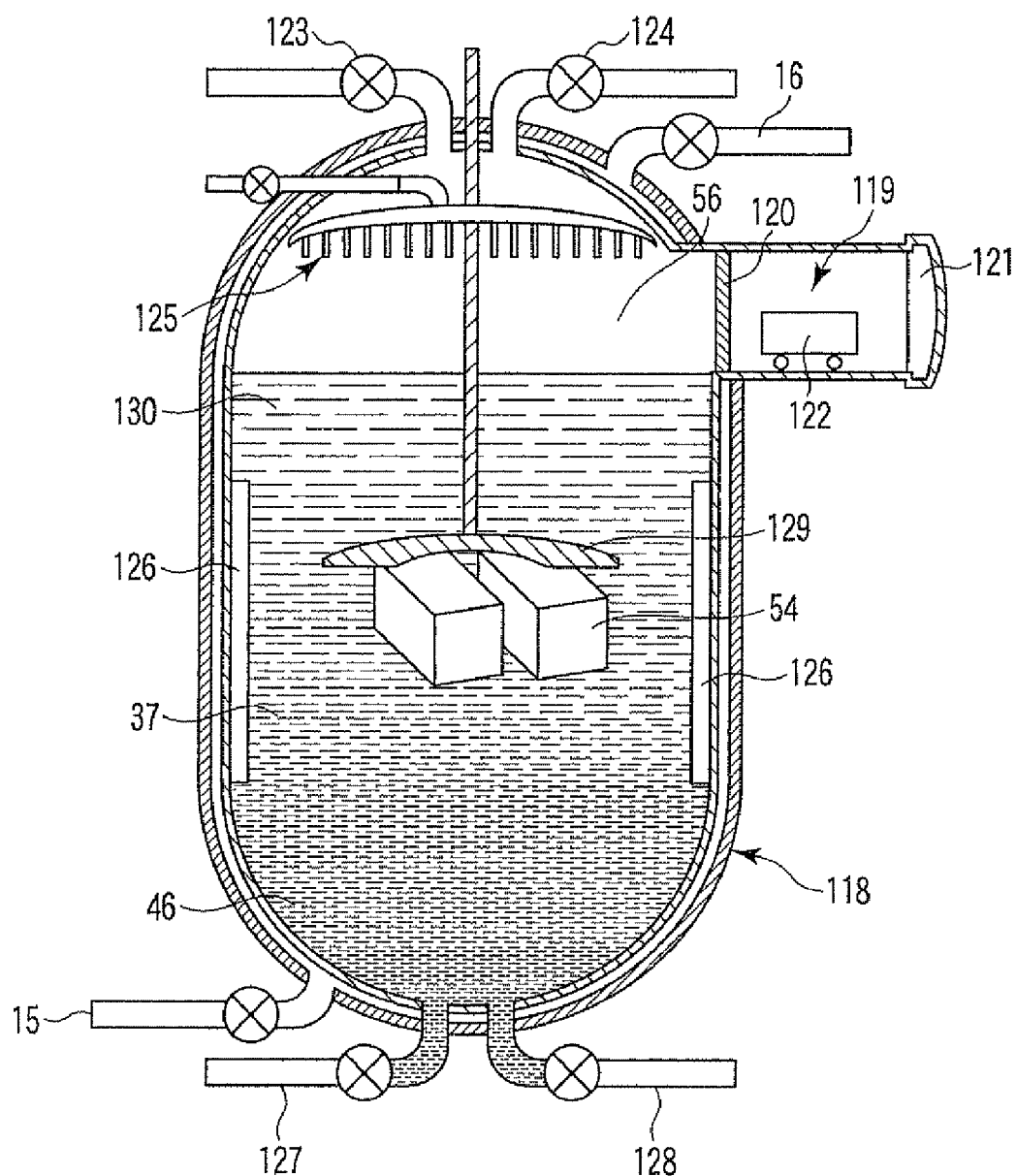
F I G. 18

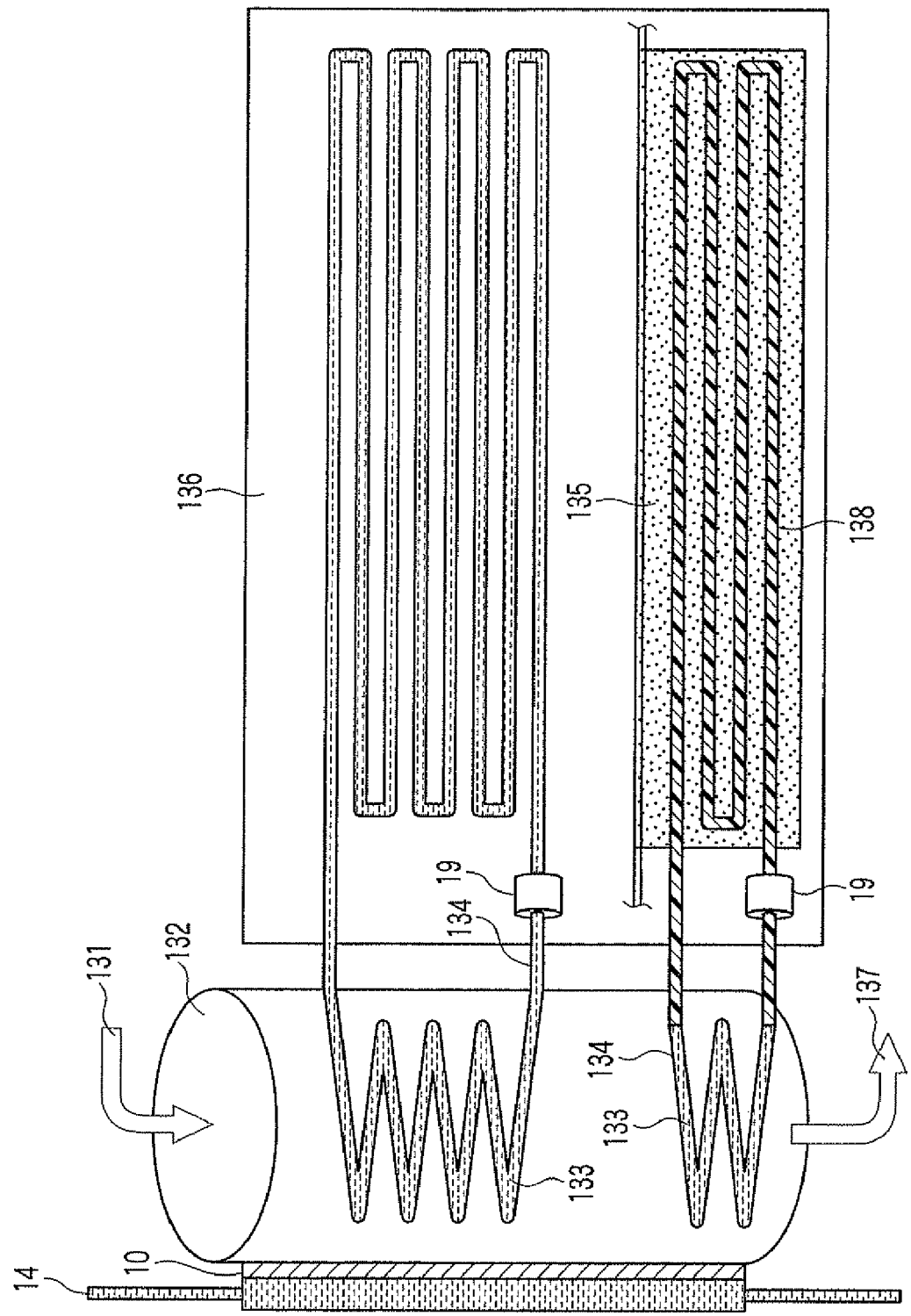
F I G. 19

ONSITE INTEGRATED PRODUCTION FACTORY

CROSS REFERENCE TO RELATED APPLICATIONS

This application is a divisional of U.S. patent application Ser. No. 12/615,437, filed Nov. 10, 2009, which is a Continuation Application of POT Application No. PCT/JP2008/058500, filed May 7, 2008, the entirety of both of which are incorporated herein by reference.

This application is also based upon and claims the benefit of priority from prior Japanese Patent Applications No. 2007-126324, filed May 11, 20071 and No. 2008-082335, filed Mar. 27, 2008, the entire contents of both of which are incorporated herein by reference.

BACKGROUND OF THE INVENTION

1. Field of the Invention

The present invention relates to an onsite integrated production factory and particularly to an onsite integrated factory provided with an electric power generating means utilizing natural energy and comprising an electrolysation plant, an ethanol plant, a vegetable plant and a fish/shellfish-culturing plant, which are integrated on a site.

2. Description of the Related Art

In every nation of the world, the reconstruction of industries such as energies, caustic soda and light metals which determine the national power is a matter of urgency. In the Russian Summit held at Sanktopeterburg in 2006, the speech of the leader of each nation emphasizes a plan for controlling the consumption of crude petroleum and refers to atomic energy, natural gas and sun energy and the like as the urgent measures taken for the post-petroleum energy. A desire to rely on natural energy without using fossil fuels is growing greatly. The power generation of natural energy includes those derived from, for example, wind power, water power (tidal power), wave power, sun light, sun heat and geothermal energy. Among these power generations, the wind power generation has a smaller installation area than other natural energy power generations since the windmill can be installed vertically and also can be utilized day and night.

Patent References 1 and 2 shown below disclose that wind power generation is utilized for the power of a pressure pump used to treat untreated water and sea water in reverse osmosis plants. Also, it is disclosed in the following Patent Reference 3 that wind power generation is used for the power of the pump used to draw sea water with the intention of desalination of sea water. It is also disclosed in the following Patent Reference 4 to make use of wind power generation as the power for producing hydrogen by the electrodialysis of fresh water obtained from equipment for desalination of sea water.

Tidal electric power generation has higher energy efficiency. The energy (W) obtained from wind power, tidal power and the like is given by the equation: $W=A\rho V^3/2$ (where, A is a flow-receiver area, $\rho$ is the density of the fluid and V is a flow rate). The density of air is 1.2 kg/m$^3$ whereas the density of water is 1025 kg/m$^3$. Therefore, if the flow of wind is changed to the flow of water, an energy which is 854 times that obtained in the case of the flow of wind can be obtained. There are, for example, the Kuroshio current (the Japan Current) and Tsushima Current around Japan. The Kuroshio current flowing through the Tokara straight, the Ashizuri Promontory, Muroto Promontory, Shiono Promontory, the Island of Miyake and the Island of Mikura is 250 km in width and 1000 m in depth and has a flow speed of 0.3 to 2 m/sec and is therefore suitable for a tidal power generation source. Because the output of a waterwheel is proportional to the 3rd power of the current, the tidal current power generation is attractive.

There is a tendency to think the foregoing fluid energies such as wind power and water flow power to be the kinds of energy sources which are mild to the global environment and are free from the exhaustion of resources. However, these energies are all limited by natural and geographical conditions and it is difficult to obtain desirable generated output depending on the meteorological conditions and places. In light of this, many methods are proposed in which these energies are utilized on the ocean where plenty of wind power energy or fluid energy such as a tidal current and ocean current is present. Patent Reference 5 shown below discloses that the generated power obtained by wind power generation to draw deep ocean water up to a pool floated and installed on the ocean. Patent Reference 6 shown below discloses that wind power generation is used for electrolytic desalination of sea water. Patent Reference 7 shown below discloses that power generation facilities utilizing natural energies such as wind power generation, wave power generation and ocean temperature difference power generation are installed on a large floating structure installed on the ocean. The following Patent References 8 and 9 disclose that the water desalinated by the power obtained by steam turbine power generation attained by sun energy, wave power generation and wind power generation is electrolyzed to produce hydrogen and oxygen gas, on the movable floating structure on the sea. The windmill installed on the deck of the drifting on the sea or floating vessels is preferably a non-directional type regardless of wind direction. The inventors of the present invention disclose a vertical axis windmill and water wheel that draw power from the both energies of wind power and tidal power in the following Patent References 10 and 11.

In Sweden, according to Non-patent Reference 1 shown below, there are the following descriptions. Specifically, the post-atomic power generation policy that atomic power generation is abolished step by step is maintained and high targets are stated as to the introduction of wind power generation. In 1970, the percentage of the dependency of energy demand on petroleum reached 70%. After that, a post-petroleum policy is promoted with the oil crisis, with the result that the percentage of the dependency on petroleum is reduced to the order of 30%. There is also the description that particularly, the percentage of the dependency of heating and hot-water supply in the public welfare section on petroleum has been already reduced to 10% with the spread of a regional heat supply system and with the progress in the conversion of fuel into biomass energy. Then, there is also the description that the ratio of bio-ethanol (5%) to be mixed in gasoline will be increased in a few years, with the result that the use of automobiles using, as the fuel, E85 containing 85% of ethanol or bio-gas obtained by the fermentation of biomass are spread. It is fresh in our memories that there was a sudden rise in grain prices as soon as, on January, 2007, Bush, President of the United States came out with the policy fixed to produce bioethanol by the fermentation of corns to thereby replace 20% of gasoline with the bioethanol by 2017. Japanese government also came out with the plan fixed to increase the production of bio-ethanol up to 6000000 kl by 2030. In Non-patent Reference 2 shown below, it is disclosed from RITE and Honda Motor Co., Ltd. that the gene of Corynebacterium is recombined to convert vegetable fibers such as celluloses into sugars, thereby producing bio-ethanol from wood chips, weeds, rice straws and wheat straws which are not used as foods. In Non-patent Reference 3 shown below, there are descriptions that bacteria which ferments sugars and starches extracted from squeezed residues of sugar canes and wood chips to produce ethanol is increased to 100 times that of usual cases. Patent Reference 12 shown below discloses a method of producing ethanol in which NADH (nicotine amide/adenine/dinucleotide reduction type) is added in a reaction medium from the outside under the ethanol production bacterial enzyme reaction condition to react the ethanol production bacteria under the presence of the compound, thereby producing ethanol production bacteria in the reaction medium, followed by collecting the produced ethanol.

Non-patent Reference 4 shown below reveals that the Japanese technologies used desalinate sea water by using a reverse osmosis membrane are advanced into all parts of the world. It is, at present, estimated that about 1.1 billion people can utilize water insufficiently in the world and that a shortage of industrial water is a cause of a hindrance to economic growth in China and the Middle East. For this, in these regions, there is a rush to construct a sea water desalinating plant. However, the construction of sea water desalination plant has the purpose of extracting fresh water, so that the brine of sea water having a salt content of about 3% is thrown into the sea as waste fluid at present.

The production facilities for desalinating sea water and for extracting metals, such as magnesium, dissolved in sea water are placed in limited areas such as the vicinity of thermal power stations in coastal areas and these metals dissolved in sea water have been called fossils of power generation like aluminum so far. As to, particularly, the production of aluminum, as shown in Non-patent Reference 5 shown below, 99% of new ores is dependent on the import in Japan and only Kamahara factory (Shizuoka prefecture) of Nippon Light Metal Co., Ltd. having a private power generation plant carries out the refining of new ores. Metal sodium is the same to the above and there is only Nihongi factory (Niigata prefecture) of NIPPON SODA Co., Ltd. as a manufacturing factory in Japan. About 1700 ton of metal sodium was used in the fast breeder reactor "Monju" in Japan and was all imported. On the other hand, caustic soda industries using salts as starting material are fundamental industries as well as sulfuric acid industries and the chemical industry in Japan and the chemical industry is started from both industries. According to the statistics for fiscal 2005, the throughput of caustic soda in Japan is 4550000 ton showing a satisfactory progress. However, because 100% of the raw salts is dependent on imported salts, a half or more of the imported price is occupied by the cost of transportation. Moreover, because large electric power is required for electrolysis to produce caustic soda from this salt, the profit of fiscal 1999 in caustic soda business department is a deficit of five hundred million, showing that caustic soda/chlorine industries in Japan will lose their international competitive power if they are not improved. This is found from the fact that the working power per ton of a product is as large as about 2500 kW as shown by Non-patent Reference 6. As measures taken for this, there are problems of urgency concerning the promotions of the shift of electric power to midnight power, new construction or extension of a private power plant and development of a large-scale troopships. In Japan, the mercury method is the mainstream of the salt electrodialysis method until the 1955s. However, an overall conversion to the diaphragm method and ion exchange membrane method was completed by June, 1986. However, as shown in Non-patent Reference 7 shown below, the mercury method which is a simple production method and is capable of producing high-purity caustic soda is scarcely abandoned and as shown in Non-patent Reference 5 shown below, the latest world trend shows that the mercury method still occupies the mainstream of the production method.

With regard to the deep ocean water, the term "deep ocean water" according to Non-patent Reference 8 is sea water which is distributed in deep sea at a depth of 200 m or more and has physical and chemical characteristics different from those of surface water, and means the deep sea water (sub-deep sea water in the North Atlantic and deep sea water in the South Atlantic Pole) which is distributed in deep ocean water and formed in two places (offshore of Greenland in North Atlantic Ocean and the Antarctic Ocean). These deep sea waters move around the oceans in all over the world over 2000 years by the thermal salt circulation and have important relations with the climate of the earth at intervals of 1000 year unit. The physical nature of each deep sea water is as follows: it has low temperatures, a high salt content and a high density and is not almost affected by the atmosphere, so that it is more reduced in change than surface water. As to the chemical characteristics of the deep sea water, sunlight insufficiently reaches the deep sea water, so that no phytoplankton grows and the deep sea water is scarcely mixed with the surface sea water, so that it is lacking in dissolved oxygen. Also, the deep sea water is rich in minerals and nutrient salts because various materials drop from the surface for a long term. There is the case where this sea water rises to the surface in a specific area of sea. This area becomes a sea area having very high biological productivity and is therefore good fisheries. An attempt is made to make use of the deep sea water for culture industries by utilizing such characteristics that the deep sea water is rich in nutrient salts and is very reduced in germs of various sorts. Also, studies are made as to applications to agriculture, applications to fermentation fields and power generation utilizing a difference in temperature between deep sea water and surface water and the like. It is said that particularly in fermented food fields such as liquor, soy sauce and breads, the use of deep sea water brings about such an effect that it promotes fermentation, improves the taste and increases the yield of alcohols in sake. In the case of, particularly, sake, it is disclosed that it has been found that deep ocean water limits the negative action of the yeast to activate the gene important for fermentation and also disclosed that a mechanism which enables the production of sake having good flavor and good taste is scientifically clarified at the gene level through joint research with an enterprise in Kochi prefecture in Japan. Also, there are the following descriptions in Non-patent Reference 9 shown below. Specifically, ocean bacteria acarioculios living in sea water at a depth of 100 m or deeper in a region extending from the tropical region to the South Atlantic Pole undergoes photosynthesis when irradiated with the near-infrared rays having a wavelength of 700 to 800 nm besides the visual rays having a wavelength of 400 to 700 nm which are adaptable to normal chlorophyll so that the synthetic efficiency is increased by 5% and is therefore promising as an absorber of carbon dioxide. Although about 20 billion ton of carbon dioxide has been absorbed every year by the photosynthesis of algae or the like in the sea so far, the above discovery results in additional absorption of about twenty million ton of carbon dioxide, referring to the possibility of the absorption of a larger amount of carbon dioxide in the sea. Patent Reference 13 shown below discloses that carbon dioxide in a vegetable factory is fixed by an artificial moss young seedling grown in a solution, to make it possible to reduce carbon dioxide. Patent Reference 14 shown below discloses that deep sea water is pumped using a windmill as a power source and is then discharged in the surface water to make a fishery. Patent Reference 15 shown below discloses that deep sea water is likewise pumped by the power of a windmill and is then discharged in the surface water to make an ocean farm. Patent Reference 16 shown below discloses that deep sea water is likewise pumped using a windmill as a power source and a holding tank is prepared to hold the deep sea water in the sea for a fixed period of time to make a fishery. Patent Reference shown 17 below discloses that deep sea water is used to produce a beer.

The above temperature-difference power generation using deep ocean water means a method in which utilizing a difference in temperature between surface ocean water heated by sun heat and cold deep sea water at a depth of 100 m or more which the sun light does not reach, a volatile medium such as Freon and ammonia is used for heat exchange to vaporize by the warm surface ocean water, thereby rotating a turbine to generate power. Patent Reference 18 shown below discloses temperature-difference power generation using deep ocean water and surface ocean water. Patent Reference 19 shown below discloses that deep sea water for temperature-difference power generation is pumped by a storage pump driven by wind power. As to a report referring to the utilization of a thermionic power generation element to the temperature-difference power generation, Patent Reference 20 shown below discloses a production method in which a thermoelement subjected to temperature-difference power generation has a resistance to vibration and impact. Patent Reference 21 shown below discloses a method of producing a portable small thermionic power generation element for temperature-difference power generation. This thermionic power generation element (thermoelement) is called a Pertier element based on the fact that when different types of semiconductors are joined to flow current, heat is generated at one junction and heat is absorbed at another junction. This means that the heat absorbed at one part is released at the other part, wherein if the direction of the current is reversed, the heat generation part and the heat absorption part are reversed. Also, when the both junctions are made to have temperatures different from each other, a potential difference is created, and this works as a temperature-difference power generating element. Non-patent Reference 10 shown below discloses that the inventors of this patent application of this case has made a device for measuring the thermal constant of a rock sample, wherein a sinusoidal wave d.c. voltage is applied to the above thermoelement such that the potential of the thermoelement is changed from plus potential to minus potential to change a temperature difference periodically and the change in heat is given to a rock sample. Patent Reference 22 shown below discloses a device that cools a laser mirror by bringing one side of a thermoelement into close contact with the laser mirror and by flowing d.c. current across the thermoelement in the condition that the other is cooled by cooling water. Non-patent Reference 11 discloses that one side of the thermoelement is heated to 500° C. or less and the other is heated to 1000° C. or less and the obtained temperature difference is utilized in a thermionic power generation element.

Even in Japan in which the self-support of foods could be relatively procured, the aging of producers, a labor shortage and the like cause an increase in the import of vegetables. China having a huge population is changed to a food-importing country during the course of its economical development and industrialization. Also, in North Europe in winter very decreased in hours of sunshine, a few green vegetables are seen on a table. In the current agriculture relying on natural energy, techniques obtained by drawing on one's resources every district as called right crop for right land have been accumulated. However, in these days of threatening of dangers from a world-wide population increase and food shortage, possible agricultural right lands must be utilized by using proper methods which limit the damages to the natural environment to the minimum. These measures are, however, limited by production area and are dependent on climate. Looking at Non-patent Reference 12 shown below and the home page of Plant Factory Laboratory, a vegetable factory is regarded as "a periodical vegetable production system utilizing high technologies such as environmental control and automation". Also, it is also described that in the vegetable factory, a vegetable culturing environment, that is, temperature, the quantity of light, and the charges of carbon dioxide, a fertilizer is controlled by a computer to thereby automatically produce crops without any labor regardless of climate. Patent Reference 23 described below discloses that a plant body is grown from a seedling by applying light including near-infrared light relatively in growth period and by applying light reduced in infrared light in the date of ripening to thereby hasten the proper time of harvesting. Patent Reference 24 shown below discloses moisture-proof type lighting equipment that reflects only visible rays so that it can be used for a long period of time even under a high-temperature and high-humidity environment as a photosynthetic light source. Patent Reference 25 shown below discloses that a fuel cell is used for the electric power of a vegetable factory and electric power is supplied to power consumption subjects by solar power generation and wind power generation. It is also disclosed in Patent Reference 26 shown below that a fertilizer blended with a bittern of deep ocean water is supplied to vegetables.

An international conference on cultured fishes was held in the City of Kobe on Jan. 22, 2007. According to Non-patent Reference 13 shown below, Amami Island has many intricate gulfs and has such a mild climate that sea temperature is not dropped to 20° C. or less all the year round. It is said that industrial officers gather here for culturing tunas. It is natural that sea areas free from, for example, the generation of a red tide are selected as fisheries. According to the State of the World as Non-patent Reference 14 shown below, a huge "dead zone" in which neither fish nor ocean organism can exist occurs in the Gulf of Mexico in every summer. This phenomenon occurs from the reason that marine organisms cannot exist because the level of the concentration of oxygen dissolved in sea water is very low. There are 146 similar oxygen-deficient sea areas in the world, wherein the oxygen-deficient sea area occurs most frequently in a place where water temperature is mild and such an area is centered on the offshore of East Coast of the United State and the seas in Europe. However, it is said that this phenomenon is observed in each coastal offshore of China, Japan, Brazil, Australia and New Zealand. The reason why oxygen-deficient sea areas occur in these coastal areas and fishes and other living bodies die is that phytoplankton and algae are abnormally generated by a stimulation from excessively concentrated nitrogen and phosphorous contained in a fertilizer when this fertilizer is thrown into rivers and sea. When this phytoplankton is dead, it sinks to the bottom of the sea, and is decayed and decomposed. Because whole oxygen around the area is consumed during the course of the above process, a low-oxygen area is produced, so said in the above Reference. Almost all ocean organisms cannot live in the low-oxygen area. Movable fishes and other moveable organisms can be saved only if they leave the oxygen-deficient area. However, there is no time enough for Crustacea and the like to leave the area and Crustacea and the like choke to death. Further, one of the main reasons why the offshore culturing of fishes is prospering is that nutrients are accumulated in coastal areas. To remove this defect, it is a key for the solution of the problem to reduce water pollution caused by the discharged nutrients to thereby restore the function of ecological systems. The Straits of Kattegat between Denmark and Sweden are suffered from a low-oxygen condition, abnormal development of plankton and massive death of fishes after nineteen seventies. In 1986, the Denmark government is touched off by the bankruptcy of lobster fishery in Norway and primarily reduces effluents from a drainage treating station and from industries, to reduce the phosphorous content in water by 80% and to restore coastal damp areas, thereby decreasing the amount of fertilizers to be used in farms. It is reported that the proliferation of plankton came to a stop by this measures, leading to an increase in the amount of oxygen in water.

Nowadays, there are three ocean wind power generation projects which are advanced in Japan. Among these projects, according to Non-patent Reference 15 shown below, a system using the power generated by a windmill to generate hydrogen is adopted in National Institute for Environmental Studies and National Maritime Research Institute and a system transmitting the power generated by the windmill to the land as it is adopted in The University of Tokyo and The Tokyo Electric Power Company, Incorporated. The system adopted in National Institute for Environmental Studies is based on the plan of a non-mooring system sailing type wind power generation plant on the deep-ocean and is forwarded based on a five-year plan from 2003. In a trial calculation, 288000 windmills will be required and the necessary area will be 124000 $km^2$, when a 5 MW (rotor diameter: 120 m) windmill is assumed as the windmill, on the premise that the operation rate of the equipment is 25%, hydrogen obtained on the ocean is transmitted to the land to consume the hydrogen by a fuel cell and that, in this case, the hydrogen conversion efficiency is 50% and the energy efficiency of the fuel cell is 60%.

The system adopted in National Maritime Research Institute is a mooring system floating type wind power generation system in which a mooring type floating body (length: 187 m and width: 60 m) is installed on the sea near the shore at a surface depth of 100 to 200 m where no fishery right is created, to carry out wind power generation. Two windmills are installed on one floating body. As the windmill, one having a rated output of 5 MW (rotor diameter: 120 m) is assumed and sea water is directly electrolyzed to produce hydrogen. However, in its immediate plan, sea water is desalinated and the resulting water is electrolyzed to produce hydrogen. Furthermore, this hydrogen is reacted with $CO_2$ transported from the land to convert these compounds into methane. The obtained methane is liquefied or is made into compressed gas, and the obtained liquid or gas is transported to the land. Actual data of wind conditions indicates that the sea area where the annual utilization factor of the equipment is 40% is four places, that is, the west coast of Hokkaido, offshore of Tohoku of Japan Sea, offshore of Boso and offshore of Izu, and these areas having a total of 15000 $km^2$ correspond to the above sea area. The wind power generation equipment in which one floating body has an output of 10 MW generates a total annual power generation of 35,040 MWh, making it possible to produce about 835 ton of hydrogen a year (conversion efficiency: 99%). The above hydrogen can be made to produce about 1,650 ton of methane (conversion efficiency: 99%). This corresponds to the amount of fuel to be used for about 4,300 cars covering a running distance of 10000 km in one year. Because the mechanization reaction of hydrogen is an exothermic reaction, a heat of $6.94 \times 10^6$ kWh is produced. This produced heat is utilized to generate electricity by using a steam power generator to reuse the obtained electricity as the power for electrolysis. In a trial calculation, the construction cost per floating body is about 4.9 billion Yen, and the cost of electricity is 11.7 Yen/kWh for 30 years of amortization period.

The system adopted in The University of Tokyo and The Tokyo Electric Power Company, Incorporated is a mooring system floating type ocean wind power generation system on the sea near the shore. It is intended to carry out an operation of a floating body type ocean wind power generation at a place about 10 km apart from the offshore of the Pacific Ocean in Kanto district, wherein the evaluation of wind conditions on the ocean, the development of the floating body and economical evaluation of the equipment and the like will be made in fiscal 2005 to 2006. Three windmills each having a rated output of 2.4 MW (rotor diameter: 92 m) will be constructed on one floating body, wherein the distance between the windmills is 180 m, and the floating body is constituted of a fundamental floating body made of RC, connecting members made of steel pipes and tension cables. The mooring will be furnished at a windmill tower and four places in the center part.

CITED REFERENCES

Patent Reference 1: Jpn. Pat. Appln. KOKOKU Publication No. 2004-537668
Patent Reference 2: Jpn. Pat. Appln. KOKAI Publication No. 2000-202441
Patent Reference 3: Jpn. Pat. Appln. KOKAI Publication No. 2004-290945
Patent Reference 4: Jpn. Pat. Appln. KOKAI Publication No. 2005-069125
Patent Reference 5: Jpn. Pat. Appln. KOKAI Publication No. 2002-059893
Patent Reference 6: Jpn. Pat. Appln. KOKAI Publication No. 2001-213388
Patent Reference 7: Jpn. Pat. Appln. KOKAI Publication No. 2002-255091
Patent Reference 8: Jpn. Pat. Appln. KOKAI Publication No. 2002-303454
Patent Reference 9: Jpn. Pat. Appln. KOKAI Publication No. 2005-145218
Patent Reference 10: Jpn. Pat. Appln. KOKAI Publication No. 2003-206848
Patent Reference 11: Jpn. Pat. Appln. KOKAI Publication No. 2003-206849
Patent Reference 12: Jpn. Pat. Appln. KOKAI Publication No. 2004-344107
Patent Reference 13: Jpn. Pat. Appln. KOKAI Publication No. 2006-254900
Patent Reference 14: Jpn. Pat. Appln. KOKAI Publication No. 2007-2721
Patent Reference 15: Jpn. Pat. Appln. KOKAI Publication No. 2005-52136
Patent Reference 16: Jpn. Pat. Appln. KOKAI Publication No. 2003-333955
Patent Reference 17: Jpn. Pat. Appln. KOKAI Publication No. 2003-169657
Patent Reference 18: Jpn. Pat. Appln. KOKAI Publication No. 2005-280581
Patent Reference 19: Jpn. Pat. Appln. KOKAI Publication No. 7-63155
Patent Reference 20: Jpn. Pat. Appln. KOKAI Publication No. 2006-278352
Patent Reference 21: Jpn. Pat. Appln. KOKAI Publication No. 2004-296960
Patent Reference 22: Jpn. Pat. Appln. KOKAI Publication No. 54-118196

Patent Reference 23: Jpn. Pat. Appln. KOKAI Publication No. 2001-57816

Patent Reference 24: Jpn. Pat. Appln. KOKAI Publication No. 5-89710

Patent Reference 25: Jpn. Pat. Appln. KOKAI Publication No. 5-135783

Patent Reference 26: Jpn. Pat. Appln. KOKAI Publication No. 2005-126278

Non-patent Reference 1: Greener World 2006-07-14: greenerw.exblog.jp

Non-patent Reference 2: The Nikkei, Mar. 30, 2007, Morning paper, "All fiber components of wood chips and weeds, to ethanol"

Non-patent Reference 3: The Nikkei, Mar. 8, 2007, Evening paper, "Ebara CORPORATION, will take his share in bio-ethanol"

Non-patent Reference 4: The Nikkei, Jan. 14, 2007, front page of Morning paper, "Water-making is spread worldwide"

Non-patent Reference 5: NIPPON KOKUSEI ZUKAI, Foundation, Yano Kota Kinenkai, Jun. 1, 2006

Non-patent Reference 6: TAKAHASHI Takehiko, INTRODUCTION TO ELECTROCHEMISTRY, Maki Shoten, Feb. 20, 1991, New edition 4

Non-patent Reference 7: The Latest Chemistry of Products, (k.k.) Kokusei (she), p79. Dec. 20, 1973

Non-patent Reference 8: Free Encyclopedia "Wikipedia"

Non-patent Reference 9: The Nikkei, Apr. 10, 2007, third page of Evening paper, "Photosynthesis by New-infrared rays/Ocean Bacteria"

Non-patent Reference 10: MURAHARA Masataka, Measurement of the thermal diffusivity of a rock by using a thermal semiconductor, THE NIKKAN KOGYO SHINBUN, Mar. 30, 1997

Non-patent Reference 11: Toshiba Press Release, the Mar. 29, 2004 issue, "As to the development of a heat conductive module generating electricity by utilizing a difference in temperature between the upper and lower surfaces"

Non-patent Reference 12: TAKATSUJI Masaki, "Fundamental and Actual Vegetable Factory", SHOKABO Non-patent Reference 13: The Nikkei, Jan. 22, 2007, Morning paper, "Fishery regulation will be strengthened, Excitement over Culturing of Tuna"

Non-patent Reference 14: State of the World 2006-7, Eco-Economy-Update 2004-10, World Watch Institute Non-patent Reference 15: Ocean Policy Research Foundation, News Letter No. 140 (Jun. 5, 2006)

BRIEF SUMMARY OF THE INVENTION

The current procurement of energy sources is limited to places rich in resources from an economical point of view and the problem is how to transport the energy resources economically to a consumer place. However, the development of modern industries brings about indiscriminate acquisition of resources and the worldwide deficiency of resources caused by the indiscriminate acquisition of resources brings about a steep rise in the prices of the resources. Fortunately, Japan is surrounded by the ocean and has the possibility of being a country rich in resources taking the outskirts of the 200-mile continental shelf. Mineral resources dissolved in sea water, fluid energy resources such as oceanic current and tide, solar heat, thermal energy resources such as submarine hot spring or a difference in temperature between submarine hot spring and sea water, drinking water and industrial water are marine resources. It is a problem to be solved by the present invention to build an integrated system in which these inexhaustible marine resources are economically recovered without using fossil fuels, and cellulose and grain which are landed are allowed to ferment by combining them with these marine resources, to produce fuel ethanol or deep sea water beer. Also, in the integrated system, carbon dioxide generated by the alcohol fermentation is used as a raw material to grow vegetables and oxygen generated by photosynthesis is supplied by bubbling from the seabed or undersea to the marine surface to increase the concentration of oxygen in the sea water, thereby promoting the growth of fishery products and also reducing low-oxygen areas on the ocean to thereby suppress the generation of red tides.

As the electric power in the integrated production factory, no fossil fuel is used but natural energy such as wind power, hydraulic power (tidal force), wave power, sunlight, solar heat or geothermal heat is used. Among these powers, the wind power generation is more reduced in installation area than other natural energy power generations because the windmill can be installed vertically to the surface of the earth and the sea, it can be utilized day and night. Particularly, tidal power generation utilizing the Kuroshio current has a significantly high generation efficiency. To mention in more detail, because water has a higher density than that of wind when comparing water wheel power generation with windmill power generation, an 854-fold increase of energy is obtained by changing the flow of wind to the flow of water. For this, the tide having a flow speed of 1 m/s, this equals to wind having a flow speed of 9.5 m/s and the tide having a flow speed of 2 m/s, this equals to wind having a flow speed of 19 m/s. Therefore, if the floating vessel on the ocean factory is moored on the ocean having the fast-flowing tide such as the Kuroshio current, the power generation efficiency can be improved. Also, the temperature-difference power generation using the deep ocean water is currently conducted by using a volatile medium such as Freon or ammonia is used for heat exchange to vaporize by the surface ocean water, thereby rotating a turbine to generate electric power. If this mechanical turbine is changed to a thermionic power generation element, power generation free from the operation part can be accomplished. Specifically, the electric power can be supplemented by, for example, temperature-difference power generation equipment having the following structure. In order to obtain a high difference in temperature, a high-temperature circulation liquid consisting of petroleum products, aromatic compounds, molten salts, meltable metals, silicone oil, sulfuric acid or oil or the like as a heating medium heated by solar heat or factory waste heat or water, hot waster water from an electrolytic plant or warm water circulation liquid such as submarine hot spring and coastal hot spring as the hot spring or hot spring water of volcanic hot spring is used on the high-temperature side, and deep sea water, surface marine water or river water is used on the low-temperature side. The solar water heater is made of either plural heat-collecting pipes arranged on the deck or a heat-collecting pipe placed on the focus line of sunlight converged by a ray-converging means such as a lens and mirror. A salt in the course of the electrolysis of the molten salts and molten salts of a salt and calcium chloride, magnesium chloride, potassium chloride, calcium chloride or caustic soda or the like are preheated by the heating medium circulated in the heat-collecting pipe prior to the heating by electric power. Then, the electric power can be supplied by the heated molten salt and cool water including the pumped deep sea water, surface ocean water or river water are made to flow in the inner tube and outer tube of a double or triple pipe structure respectively and semiconductor thermionic power generation elements are arranged in the middle tube between these inner and outer tubes.

Researches and developments are being made in wide fields such as power generation, fuel for transportation and city gas by using a hydrogen combustion turbine, by using hydrogen converted from clean and reproducible energy such as sunlight and wind power. Particularly, sea water is desalinated by the power obtained by wind power generation on the ocean and the obtained water is electrolyzed to produce hydrogen, which is then stored in a bomb in a liquid state. Therefore, developments and researches are being made concerning hydrogen absorbing metals for transporting to the land and reduction in the weight of a bomb for storing hydrogen. In an electric power station and facilities such as city gas plant and factories for charging fuel cells which need a large amount of hydrogen in a short time, solid hydrogen is suitable. Metal sodium has a specific gravity of 0.971 and is hence lighter than water and is also safe when stored in petroleum. Therefore, if hydrogen is produced on the ocean, transportation cost and costs of a storage tank and the like can be reduced. Combustion energy generated by liquefying the metal sodium and by reacting this metal sodium with steam or oxygen can be used to generate electricity. However, if hydrogen generated by spraying water on this metal sodium as a simple method is used in an electric power station, and facilities such as city gas plant and factories for charging fuel cells, caustic soda as its waste may be supplied as economic raw material to be used in soda industries. On the other hand, caustic soda is subjected to molten salt electrolysis performed using the electric power obtained by wind power generation to constitute a sodium fuel cycle for reproducing metal sodium in consideration of the balance between the demand and supply of caustic soda and metal sodium for generation of hydrogen. This sodium fuel cycle is a system in which fuel is produced endlessly to reproduce it in the same manner as in the nuclear fuel cycle for reproducing uranium and plutonium by retreating spent nuclear fuel in an atomic power plant. However, the sodium fuel cycle recommended by the present invention is safe because no radioactive waste is produced unlike the nuclear fuel cycle. Also, in contrast with uranium that is deposited only in limited areas in a small amount in the world, sodium is present inexhaustibly as salts in sea water and also exists as a rock salt abundantly on the land. Although sodium is fuel which is abundant in the sense of resource and can be supplied in every nation of the world, it must be very carefully treated. This metal sodium reacts with water explosively to generate hydrogen, which is burned by its reaction heat. When water is added to sodium which is contained in oils to limit the combustion and oxidation, by spraying, instillation or pulse-wise addition from above, water having a higher specific gravity than the oil passes at a high speed in the oil. Water is brought into contact with metal sodium while it passes to cause a chemical reaction. Or, the water layer in contact with the lower layer of the oil may be stirred by ultrasonic vibration to bring the mixture of oil and water into contact with metal sodium to cause the reaction of water with metal sodium. Moreover, water may be sprayed toward metal sodium in the oil layer from plural high-pressure water spray nozzles. In order to run the reaction directly with water, metal sodium floated in the oil layer may be pushed down by a control bar from the above to react metal sodium with water under the oil layer. In order to cause the reaction more violently, water may be added to metal sodium by spraying, instillation or pulse-wise addition after the oil is withdrawn under hydrogen or an atmosphere of inert gas such as argon or nitrogen. Hydrogen and caustic soda can be drawn from the top and bottom of the reactor. A structure may be adopted in which a cooling jacket is provided on the outside periphery of the reactor to make cooling water flow in the case where a rise in temperature by the reaction heat is steep. Anti-corrosion materials such as stainless, polyethylene and polypropylene may be used for the reactor. It is a problem to be solved by the present invention to make such a circulating system.

When the amount of water to be supplied to metal sodium is small, and specifically, when water is added to metal sodium from the water spray nozzle located on the upper part of the reactor after the oil is withdrawn, the temperature becomes higher by the reaction heat and reaches a temperature higher than the flash point (500° C.) of produced hydrogen. Particularly, when oxygen is poured into the reaction system, hydrogen is burned to raise the temperature of the system. In order to utilize this heat, a heating medium as a primary cooling agent is circulated in the cooling jacket around the outer periphery of the reactor to boil water as a secondary cooling water by this heat, thereby rotating the steam turbine, making it possible to supply electric power. When the amount of water to be supplied to metal sodium is large on the other hand, and specifically when metal sodium floated in the oil layer is pushed down by the control bar from above to react a large amount of water under the oil layer with metal sodium, the temperature is not so much raised because the heat capacity of water is large, ensuring that hydrogen can be stably produced. Of course, hydrogen is not burned because no oxygen is supplied in water.

In view of the above problems, the present invention has been made. Specifically, it is an object of the present invention to provide an onsite integrated production factory as a measure which is not limited by natural and geographical conditions, climatic conditions and places. In the integrated system, desired electric power and raw materials are obtained in one defined area to thereby produce fresh water, sodium, magnesium, calcium, potassium, caustic soda, chlorine, hydrochloric acid, sulfuric acid, hydrogen, oxygen or the like by using sea water, salt lake water or rock salt as a raw material, cellulose materials and grains which are landed are allowed to ferment by combining them with these produced materials, to produce fuel ethanol or deep sea water beer, and carbon dioxide generated by the alcohol fermentation is used as a raw material to grow vegetables. Hot spring water is utilized to produce tropical or subtropical plants in the vegetable plant. For this, a metal pipe in which water as a secondary heat water is circulated is arranged around the periphery of a warm water passage and a warm water container in which hot spring primary hot water flows and the secondary hot water is utilized for heating to raise the soil temperature and culture temperature in the vegetable plant to culture tropical or subtropical vegetables. Oxygen generated by photosynthesis in the vegetable plant is provided to keep the concentration of oxygen in the sea water to thereby grow fisheries. Namely, the onsite integrated production factory is provided as an ocean composite plant to reduce the energy loss in the production, storage and transportation and also, to improve the efficiency of the whole system. With regard to, particularly, the supply of metal sodium as the energy source, a rock salt and a salt lake are exist on the land besides enormous sea water on the ocean. The rock salt occupies ¾ of the amount of the salts produced in the world. These salts on the land and natural energy on the land, for example, wind power generation, sunlight power generation, solar power generation and solar heat are used to produce metal sodium directly by molten-salt electrolysis or indirectly by further subjecting sodium hydroxide produced by the electrolysis of an aqueous salt solution, to molten-salt electrolysis. In the world, there is an area in which the salt concentration of the sea water is 1% or less though the area is blessed with ocean wind force like Baltic sea, and also, a fresh water lake. A rock salt is transported to these areas, where metal sodium is produced. In the continent, there are rock salt areas and salt lakes in South America, North America and Europe and many of the lands are also wind power generation areas. The rock production countries in 2003 are United State of America 16300000 ton, Germany 15000000 ton, Italy 3000000 ton, Spain 2000000 ton, England 1500000 ton, Brazil 1300000 ton and Pakistan 1300000 ton. Also, the rock production countries are distributed widely and these countries are typified by Russia, China, Mongolia, Iran, Morocco, Algeria, Libya, Yemen, Argentina, Columbia, Ecuador, Peru and Chile. As the salt lake, Lake Michigan and Salt Lake in America, The Dead Sea in Israel, and Lake Lefroy and the like are famous. Metal sodium may be produced in lakes and rock salt drilling sites and the like in these areas and transported to consumer places. A production system in such an area having raw materials and power sources jointly can reduce an energy loss in production, storage and transportation and enables the provision of an energy production plant capable of improving the efficiency of the whole system.

The above object is attained by an onsite integrated production factory according to the present invention, the production factory being provided with a power generating means utilizing natural energy including fluid energy power generation using wind or tide, temperature-difference thermionic power generation using solar heat and sea water or optical power generation using a solar battery, and comprising an electrolytic plant producing fresh water, sodium, magnesium, calcium, potassium, caustic soda, chlorine, hydrochloric acid, sulfuric acid, hydrogen, oxygen, or the like by using sea water, salt lake water or rock salt as a raw material, an ethanol plant producing fuel bioethanol or alcohol drinks including deep sea water beer and sake together with oxalic acid or sodium oxalate by fermenting cellulose materials or grains by using fresh water, sulfuric acid or caustic soda produced in the ethanol plant, wherein oxalic acid or sodium oxalate produced in the ethanol plant is used as an agent for removing calcium contained in sea water in the electrolytic plant, a vegetable plant producing vegetables by photosynthesis using carbon dioxide generated in the fermentation process in the ethanol plant, fresh water produced in the electrolytic plant, sunlight or artificial light, and a culturing plant growing fisheries in a fishery farm or underwater reef where fish live which are formed by introducing oxygen generated in the photosynthesis, into sea water to supplement the concentration of oxygen in the sea water or to suppress the generation of a red tide and by discharging the sea water obtained by supplementing oxygen to deep sea water pumped in the electrolytic plant, in the surface sea water, on a site. The onsite integrated production factory of the present invention may be installed in a floating body vessel or lifting vessel constituted of a multi- or mono-hull or a megafloat floating on the sea, a littoral structure or a structure on the land.

The onsite integrated production factory of the present invention is an integrated factory in which the electrolytic plant, ethanol plant, vegetable plant and culturing plant are installed in a large catamaran, multihull or monohull, submarine, megafloat, littoral structure or a structure disposed on the land adjacent to the seashore. For example, in order to obtain a large amount of electric power on the ocean from fluid energy, the integrated structure is provided with plural non-directional vertical axis wind or water wheels or propeller type horizontal axis wind or water wheels are disposed on or under the deck and can be navigated on the ocean, floated on a resource collecting site or moored while continuing production. Particularly, in ocean current power generation utilizing ocean current such as the Kuroshio current, the vessel is moored. Also, a multihull is preferable to a monohull to carry out ocean current power generation, and plural non-directional vertical axis wind wheels are installed on the deck made by combining two or more vessels and plural ocean current power generation vertical axis water wheels or propeller horizontal water wheels to carry out water wheel power generation under the ocean surface under the deck. Moreover, as the power generation utilizing sunlight, high-density sunlight converged by a strip plane mirror which works as a convex mirror and an objective mirror is introduced into a system provided with mirrors having a bandpass filter or cold filter film which transmits light having a wavelength range of 600 to 700 nm and reflects infrared rays having a wavelength higher than the above wavelength range, and a solar cell improved in power generation efficiency by cooling its back with sea water, and the infrared rays reflected on the bandpass filter film are converged to thermionic power generation element and subjected to temperature-difference power generation using sea water. Here, if the objective mirror which converges sunlight is provided with a cold filter film which transmits light having a wavelength range of 600 nm or less and reflects the rays having a wavelength higher than the above wavelength range, the visible rays transmitted through the objective mirror are used for the photosynthesis in the vegetable plant. Warm water circulated in solar heater pipes stretched around the surface of the deck, or high-temperature circulating liquids of oil petroleum products such as light gas oil and kerosene, aromatic compounds such as diphenyl ether, dichlorobenzene and alkylbenzene, dissolved salts such as sodium nitrate and potassium nitrate, metal sodium, mercury, lead or easily dissolvable metals such as sodium and potassium, silicone oil, sulfuric acid and oil as heating mediums circulated in a heat-collecting pipe arranged on the focus line of the sunlight converged by a ray-converging means such as a lens or mirror may be used as auxiliaries for the heating of the molten salt in the molten salt electrolytic plant. Moreover, wastes of these heating mediums and cool water consisting of pumped deep sea water or surface ocean water are made to flow in the inner tube and outer tube of a double or triple pipe structure respectively and a semiconductor thermionic power generation elements are arranged between these inner and outer tubes, to constitute a temperature-difference power generation. Natural energies such as this temperature-difference power generation and temperature-difference power generation equipment having a structure in which the converged sunlight is applied to one surface of a thermionic power generation element through a heat absorbing layer and sea water is made to flow on the other surface of the thermionic power generation element are the electric power of the onsite integrated production factory. A difference in temperature between high-temperature liquid such as submarine hot spring, coastal hot spring or volcanic hot spring and river water or sea water is utilized for a thermionic power generation element to generate electricity. There are many high-temperature hot springs having a temperature of 45° C. or more in Japan: examples of these hot springs include submarine hot springs scattered in Okinawa Trough sandwiched between East China Sea including the main island of Okinawa and Ishigaki island and Ryukyu islands gushes with hot water having a temperature of 300° C. or more, coastal hot springs such as Ibusuki Onsen in Kagoshima prefecture, Shirahama Onsen in Wakayama prefecture, and Shimogamo Onsen and Toi Onsen in Izu peninsula, and volcano type hot springs including hot springs having a temperature of about 98° C. such as Arima Onsen in Hyogo prefecture, Tamagawa Onsen in Akita prefecture, Matsunoyama Onsen in Niigata prefecture and hot springs having a temperature of about 90°

C. such as Yunomine Onsen in Wakayama prefecture and Kusatsu Onsen Bandai in Gunma prefecture and Kirishima Onsen in Kagaoshima prefecture. Temperature-difference power generation using these hot spring waters and cool river water is also effective as thermal energy power generation. The hot spring water which has been subjected to the temperature-difference power generation can be utilized as dashing type hot springs having 100% of the head spring without adding water. Particularly in the case of a hot spring, the content of calcium is as large as 10 to 20 times that of marine water and therefore, the hot spring water is not made to flow in the outer tube but to flow in a round inner tube as the pipe for flowing high-temperature hot spring water, to make easy to remove precipitate. When a super water-repellent material such as graphite or a fluororesin is used for the inner wall, the adhesion of crystals to the tube wall can be limited. As other method, metal pipes in which water as the secondary hot water is circulated are stretched around the periphery and inside of a river, warm-water passage and warm-water storage tank in which high-temperature hot spring water to be used as the primary hot water is made to flow. That secondary hot water is supplied for heating to raise the temperatures of a soil and the culture temperature in the vegetable plant, and is also supplied to the vegetable plant for culturing tropical or subtropical vegetables and for room heating.

In the electrolytic plant producing fresh water, sodium, magnesium, calcium, potassium, caustic soda, chlorine, hydrochloric acid, sulfuric acid, hydrogen, oxygen and the like by using sea water as the raw material, the sea water is treated with a reverse osmosis membrane to produce fresh water and then, oxalic acid or sodium oxalate produced in the ethanol plant is poured into the remainder 6% salt brackish water to remove calcium. Then, caustic soda produced in the electrolytic plant is poured into the filtrate to precipitate only a magnesium salt, and then, the solution is neutralized by hydrochloric acid produced in the electrolytic plant to form magnesium chloride, which is then subjected to molten salt electrolysis to produce metal magnesium. Hydrochloric acid produced in the electrolytic plant is poured into the filtrate, on the other hand, to convert sodium sulfate into sodium chloride and the resulting filtrate including sodium chloride is subjected to an ion exchange membrane to produce brine having a concentration 20% or more and then, the brine is electrolyzed to produce caustic soda and byproducts including chlorine, hydrogen and oxygen. On the other hand, waste sulfuric acid is concentrated by a reverse osmosis membrane and concentrated sulfuric acid is used for cellulose decomposition in the ethanol plant. Here, hydrochloric acid is poured into calcium oxalate precipitated after oxalic acid or sodium oxalate is added to the brine, and produced calcium chloride and sodium chloride concentrated by the ion exchange membrane are respectively further concentrated under heating to produce a mixed salt containing about 60% of sodium chloride and about 40% of calcium chloride is subjected to molten salt hydrolysis at about 600° C. Then, the obtained mixture is cooled down to 110° C. to directly produce metal sodium without the treatment using caustic soda for separating sodium from calcium.

In the ethanol plant, deep ocean water pumped in the electrolytic plant, and landed starch and malt and the like are used as the raw materials to undergo alcohol fermentation, thereby manufacturing deep sea water beer or sake, and cellulose materials such as landed wood chips and scrap wood are decomposed by sulfuric acid produced in the electrolytic plant and combined with fresh water manufactured in the electrolytic plant to ferment, thereby manufacturing fuel bio-ethanol. Carbon dioxide generated by these alcohol fermentation is supplied as photosynthetic raw material in the vegetable plant. Also, carbon dioxide generated by pouring caustic soda manufactured in the electrolytic plant into a part of the cellulose material, or carbon dioxide obtained by the alcohol fermentation, and carbon monoxide generated by red-heating cokes are absorbed by caustic soda to produce sodium oxalate or oxalic acid, which is then used as an agent for removing calcium in the sea water used in the electrolytic plant.

In the vegetable plant, carbon dioxide generated in the ethanol plant, fresh water obtained by desalinating deep ocean water or surface ocean water in the electrolytic plant, visible rays which are eliminated by the bandpass filter and are not supplied for sunlight power generation, a fluorescent lamp which is artificial light and a light emitting diode and the like are used to run photosynthesis. Oxygen generated at the unexposed time is supplied for the supplement of oxygen concentration in sea water in the culturing plant and for suppressing the generation of a red tide, and also supplied to the deep see water pumped in the electrolytic plant for growing fishes in fisheries or underwater reefs where fish live. An oxygen discharge pipe extended to a fish preserve, underwater reef where fish live, or the bottom or middle of the sea is installed as a measures for dissolving oxygen in the sea water and a water-repellent porous film or a sponge is applied and stretched on the interface of the sea water at the gas outlet of the pipe to press oxygen gas into the sea in the condition that the sea water and gas are separated from each other by adjusting the water depth and oxygen gas seal pressure. The gas pressure of oxygen depends on the depth of the sea water, and water pressure rises at a rate about 1 atm every 10 m in depth. Therefore, it is necessary to apply a pressure of 2 atm or more $(1+1+\alpha)$ at a surface depth of 10 m, 11 atm or more $(1+10+\alpha)$ at a surface depth of 100 m and 31 atm or more $(1+30+\alpha)$ at a surface depth of 300 m. Here, $\alpha$ is a pressure decided by the hole diameter of the porous film. On the other hand, the deep ocean water pumped in the electrolytic plant is, after it is subjected to the temperature-difference power generation, used to cool for cold district farm room of the vegetable plant and then, the deep sea water is divided into two lines. The deep sea water in one of these lines is subjected to desalination in the electrolytic plant and is then used as the raw material of beer or sake in the ethanol plant or as the raw material used for the water culture method in the vegetable plant, and the other is discharged into a cold current fishery preserve or discharged into the surface ocean water as it is to form fisheries having an enclosure for warm current fisheries, bottom-water fishes or shrimps and crabs and the like or natural fisheries and underwater reefs for migratory fishes which cluster around the deep sea water rich in nutrients around the fisheries.

In the present invention, two methods are adopted as the method of producing metal sodium. One of these methods is a method in which a salt water solution containing a salt or rock salt or salt lake water is electrolyzed to produce caustic soda, which is then subjected to molten salt electrolysis to produce metal sodium. This reason is that this method of producing metal sodium through the production of caustic soda is more decreased in total cost and there are larger demands for caustic soda and hydrochloric acid produced as byproducts in other processes in the factory. Although caustic soda is usually a starting material of soda industries, metal sodium is produced via caustic soda in the present invention because abundant electric power can be supplied by water wheel/windmill power generation on the ocean or wind power generation on the land. The other method is a method in which a common salt is directly subjected to molten salt electrolysis to produce sodium. Particularly, in the present invention, sodium oxalate produced in the ethanol plant is poured into the brine to remove calcium in the brine, and hydrochloric acid is poured into the precipitate calcium oxalate to recover oxalic acid and make calcium chloride free. However, when a mixed salt prepared by adding about 40% of calcium chloride to sodium chloride as a catalyst is subjected to molten salt electrolysis, the temperature of the electrolytic bath is dropped to about 600° C. from about 800° C. Though caustic soda and hydrogen are not produced as byproducts, it is hard to abandon this method because this method is superior in workability and safety. Both the metal sodium products obtained in these two methods are transported to the hydrogen supply facilities on the land, where water and sodium are reacted with each other to generate hydrogen, and caustic soda which is a reaction residue obtained after the production of hydrogen is supplied as it is as the raw material of soda industries. Specifically, this implies that caustic soda which is the raw material of soda industries can be supplied without cost. The annual consumption of caustic soda in our country is as large as 4450000 ton which is the third in rank. When comparing this with the annual power consumption (1.1 trillion kWh), the power consumption is incredibly larger. For this, it is considered that if the equipment of the present invention is in such a situation that it is fully operated, the supply of caustic soda is excessive. For this, the supply of caustic soda to soda industries is limited taking the balance between the demand and supply into account, a sodium fuel cycle for reproducing metal sodium can be established by subjecting caustic soda of the reaction residue to molten salt electrolysis by using the electric power obtained wind power generation. This sodium fuel cycle is a system in which fuel is produced endlessly to reuse it in the same manner as in the nuclear fuel cycle for reproducing uranium and plutonium by retreating spent nuclear fuel in an atomic power plant. However, the sodium fuel cycle recommended by the present invention is safe because no radioactive waste like the nuclear fuel cycle is produced. Also, uranium is deposited only in limited areas in the world and is limited in reserve like fossil fuels so that there is a fear that it is exhausted in dozen years or so in the future. In contrast with these small resources, sodium is present inexhaustibly as salts in sea water and also exists as a rock salt on the land abundantly. The sodium is a fuel in rich resources and can be supplied all over the world. Also, metal sodium has a specific gravity of 0.971, so that it is lighter than water and it can be stored in petroleum oil, making it possible to reduce energy loss when its products are stored and transported. Because a large amount of hydrogen can be instantly generated according to the need by reacting this metal sodium with water in electric power stations, city gas factories and factories for charging fuel cells or the like, it is unnecessary to fill it in a heavy bomb in a liquid state to transport it by land unlike hydrogen obtained by the electrolysis of water. For this, the cost of transportation can be reduced and the residual caustic soda can be supplied as the raw material for soda industries. However, this metal sodium reacts with water explosively to generate hydrogen, which is burned by its reaction heat. Particularly, it reacts violently with, for example, water, moistened air, carbon dioxide and hydrocarbon halides. In particular, it is necessary to take meticulous care for the reaction control and safety of a hydrogen generator in which water is added to metal sodium to generate hydrogen. Therefore, the structure of the hydrogen generator must be designed to hinder the combustion and oxidation of hydrogen produced by the reaction and reaction heat of metal sodium with water. For this, sodium may be stored in oils and water mists may be dropped from above on the oil layer while sodium is kept in the oils to mild the reaction. When water is dropped by instillation from plural nozzles (taps), the amount of hydrogen to be generated is increased. When water is sprayed pulse-wise from plural pressure water jetting nozzles toward metal sodium in the oil layer, the contact area between sodium and water is increased in a short time, a sharp reaction is caused. However, if water is added to sodium stored in oil, water which does not participate in the reaction is collected under the oil layer. Therefore, in order to react the water with sodium, the whole reactor is stirred by ultrasonic vibration to thereby the mixture solution of oil and water into contact with metal sodium to activate the reaction between water and metal sodium. In order to react the water directly with sodium, metal sodium floated in the oil phase may be pushed down by a control bar from the above to react metal sodium directly with water under the oil phase. In order to cause the reaction more violently, water may be directly added to metal sodium by spraying, instillation or pulse-wise addition after the oils for protecting metal sodium are withdrawn from the reactor under an atmosphere of dry inert gas such as argon or nitrogen or of hydrogen gas and hydrogen and caustic soda can be drawn from the top and bottom of the reactor respectively. A structure may be adopted in which a cooling jacket is provided on the outside periphery of the reactor to make cooling water flow in the case where a rise in temperature by the reaction heat is steep. Anti-corrosion materials such as stainless, polyethylene or polypropylene may be used for the reactor. Though metal magnesium which can produce hydrogen by reacting with hot water is produced by the molten salt electrolysis in the same manner as in the case of metal sodium, the amount of magnesium to be produced from sea water is as small as 11.2% of that of sodium. If this metal magnesium is used as a hydrogen-generating source, it entails an enormous cost further to reduce an oxide which is the residue of magnesium. In the mean time, a metal sodium residue after hydrogen is produced can be used as the raw material for soda industries as it is. Therefore, if metal sodium is specialized as a material for generation of hydrogen and metal magnesium is used as a light metal alloy material, the both respectively have a far-reaching economic effect.

BRIEF DESCRIPTION OF THE SEVERAL VIEWS OF THE DRAWING

FIG. 1 is a schematic structural view showing one embodiment of the present invention.

FIG. 4 is a schematic view of a temperature-difference thermionic power generation system using a cylinder type spherical mirror.

FIG. 5 is a schematic view of a temperature-difference thermionic power generator and a solar battery power generation system using a strip type plane mirror.

FIG. 7 is a production process diagram (I) in an electrolytic plant.

FIG. 9 is a production process diagram in a vegetable plant.

FIG. 10 is a production process diagram in a fishery product-culturing plant.

FIG. 11 is a production process diagram (II) in an electrolytic plant.

FIG. 15 is a production process diagram (VI) in an electrolytic plant.

FIG. 18 is a schematic view of a hydrogen generator.

FIG. 19 is a heating system diagram of a vegetable plant utilizing dashing hot spring water.

DETAILED DESCRIPTION OF THE INVENTION

Figure 2:
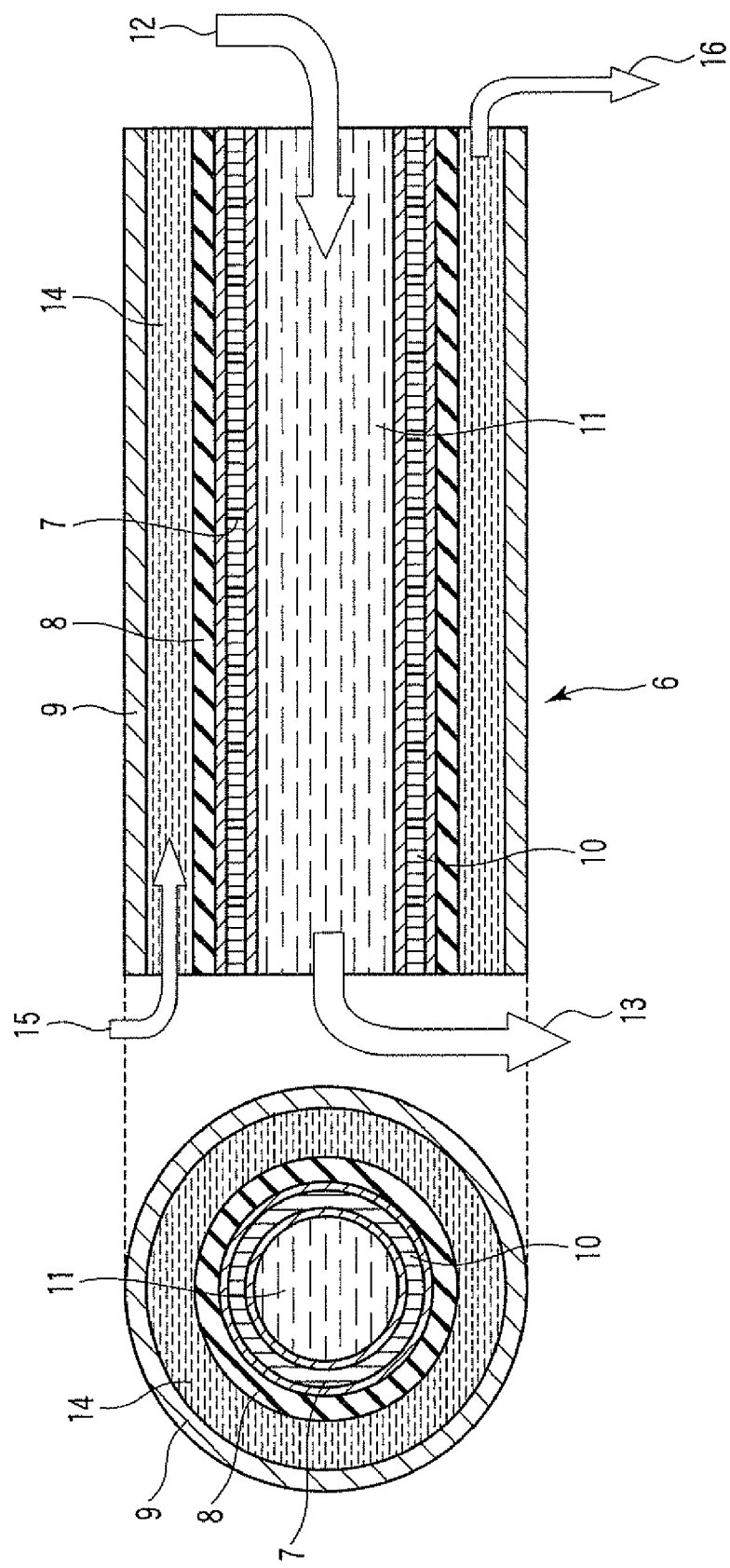
FIG. 2 is a typical view of a temperature-difference thermionic power generator.

Several embodiments of the present invention will be explained in detail with reference to FIG. 1 to FIG. 21.

FIG. 1 is a schematic view showing an embodiment of the present invention. As shown in FIG. 1, an onsite integrated production factory 1 according to the present invention includes an electrolytic plant 2, an ethanol plant 2, a vegetable plant 3 and a culturing plant 4 and these factories 2 to 4 are installed in a floating body vessel floated on the ocean, a structure on the coast or a structure on the land adjacent to the seashore. The energy obtained by fluid energy power generation utilizing wind and tide, temperature-difference power generation utilizing hot water heated by the infrared ray of sunlight or high-temperature hot spring water such as submarine hot spring and coastal hot spring, and sea water or river water, or solar cell power generation utilizing the visible rays of sunlight or the like are supplied to the integrated production factory 1. The main raw materials of the products of integrated production factory 1 of the present invention is sea water such as deep sea water and surface sea water. The sea water is decomposed in the electrolytic plant 2 to produce fresh water, sodium, magnesium, calcium, potassium, caustic soda, chlorine, hydrochloric acid, sulfuric acid, hydrogen, oxygen and the like. In electrolytic plant 2, first, sea water pumped by a storage pump is treated with a reverse osmosis membrane to produce fresh water and then, oxalic acid or sodium oxalate produced in the ethanol plant 3 is poured into the remainder 6% salt brackish water to remove calcium. Then, caustic soda produced in the electrolytic plant 2 is poured into the filtrate to precipitate only a magnesium salt, and then, the solution is neutralized by hydrochloric acid produced in the ethanol plant 2 to form magnesium chloride, which is then subjected to molten salt electrolysis to produce metal magnesium. Hydrochloric acid produced in the electrolytic plant 2 is poured into the filtrate, on the other hand, to convert sodium sulfate into sodium chloride and the resulting filtrate including sodium chloride is subjected to an ion exchange membrane to produce brine having a concentration 20% or more and then, the brine is electrolyzed to produce caustic soda and byproducts including chlorine, hydrogen and oxygen. On the other hand, waste sulfuric acid is concentrated by a reverse osmosis membrane and concentrated sulfuric acid is used for cellulose decomposition in the ethanol plant 3. In the ethanol plant 3, deep ocean water pumped in the electrolytic plant 2, landed starch and malt, rice, mold starter, millet and the like are used as the raw materials to run alcohol fermentation, thereby manufacturing deep sea water beer or sake, and cellulose materials such as landed wood chips, scrap wood and marc of cane are decomposed by sulfuric acid produced in the electrolytic plant 2 and combined with fresh water manufactured in the electrolytic plant 2 to ferment, thereby manufacturing fuel bioethanol. Here, carbon dioxide generated by pouring caustic soda manufactured in the electrolytic plant 2 into a part of the cellulose material landed for producing bioethanol, or carbon dioxide obtained by the alcohol fermentation, and carbon monoxide generated by redheating landed cokes are absorbed by caustic soda to produce sodium oxalate or oxalic acid, which is then used as an agent for removing calcium in the sea water or brine used in the electrolytic plant 2. The purity of magnesium chloride or sodium chloride to be supplied as the raw material of the molten salt electrolysis can be improved in advance by this calcium-removing treatment. Also, carbon dioxide generated by the alcohol fermentation in the ethanol plant 3, fresh water obtained from deep ocean water or surface sea water by desalination in the electrolytic plant 2, 350 to 800 nm visible rays removed by the bandpass filter or cold filter during daylight hours and is not supplied for sunlight power generation or artificial light including lamp light and light emitted from a light emitting diode are used to undergo photosynthesis, wherein the day and night are switched artificially to produce vegetables day and night. Oxygen generated at the unexposed time is supplied for the supplement of oxygen concentration in sea water in the culturing plant 5 and for suppressing the generation of a red tide, and also supplied to the deep see water pumped in the electrolytic plant 2. The deep sea water increased in oxygen concentration is discharged in surface sea water for growing fishes in fisheries or underwater reefs where fish live. The deep ocean water pumped in the electrolytic plant 2 is supplied for the temperature-difference power generation, is then used to cool for cold district farm room of vegetable plant 4 and then, the deep sea water is divided into two lines. The deep sea water in one of these lines is subjected to desalination in the electrolytic plant 2 and is then used as the raw material of beer or sake in the ethanol plant 3 or as the raw material used for the water culture method in the vegetable plant 4, and the other is discharged into a cold current fishery preserve or discharged into the surface ocean water as it is to form fisheries having an enclosure for warm current fisheries, bottom-water fishes or shrimps and crabs and natural fisheries and underwater reefs for migratory fishes which cluster around the deep sea water rich in nutrients around the fisheries.

FIG. 2 is a schematic view of a temperature-difference thermionic power generator. A temperature-difference power generator 6 has a triple tube structure and consists of an inner tube 7, a middle tube 8 and an outer tube 9, wherein thermionic thermoelements 10 are arranged in the middle tube 8. A high-temperature liquid 11 such as warm water heated by a solar heater, hot oil or water heated in heat collecting pipe arranged on the focus line of sunlight converged by a light condensing means such as a lens or mirror, heat waste water in the electrolytic plant 2 and high-temperature spring water such as a submarine hot spring and coastal hot spring is introduced from a tap 12, discharged from a tap 13 and returned to a heat collecting section. At the same time, a cool water 14 including deep sea water and surface ocean water pumped in the electrolytic plant 2 is introduced from a tap 15 and discharged from a tap 16. A thermionic thermoelement used here has a plane square shape, and therefore, the outside wall of the inner tube 7 is made into a polygon tubular surface to apply one surface of the thermionic thermoelement in close contact with the outside wall of the inner tube 7 and to stick the other to the inside surface of the middle tube 8 through a heat conductive adhesive. Then, the deep sea water which has been subjected to the temperature-difference thermionic power generation 6 is used to cool the cold district farm room of vegetable plant 4 and then, the deep sea water is divided into two lines. The deep sea water in one of these lines is subjected to desalination in the electrolytic plant 2 and is then used as the raw material of beer or sake in the ethanol plant 3, and the other is discharged into a cold current fishery preserve in the culturing plant 5 or discharged into the surface ocean water as it is to form fisheries having an enclosure for warm current fisheries, bottom-water fishes or shrimps and crabs and natural fisheries and underwater reefs for migratory fishes which cluster around the deep sea water rich in nutrients around the fisheries.

Figure 3:
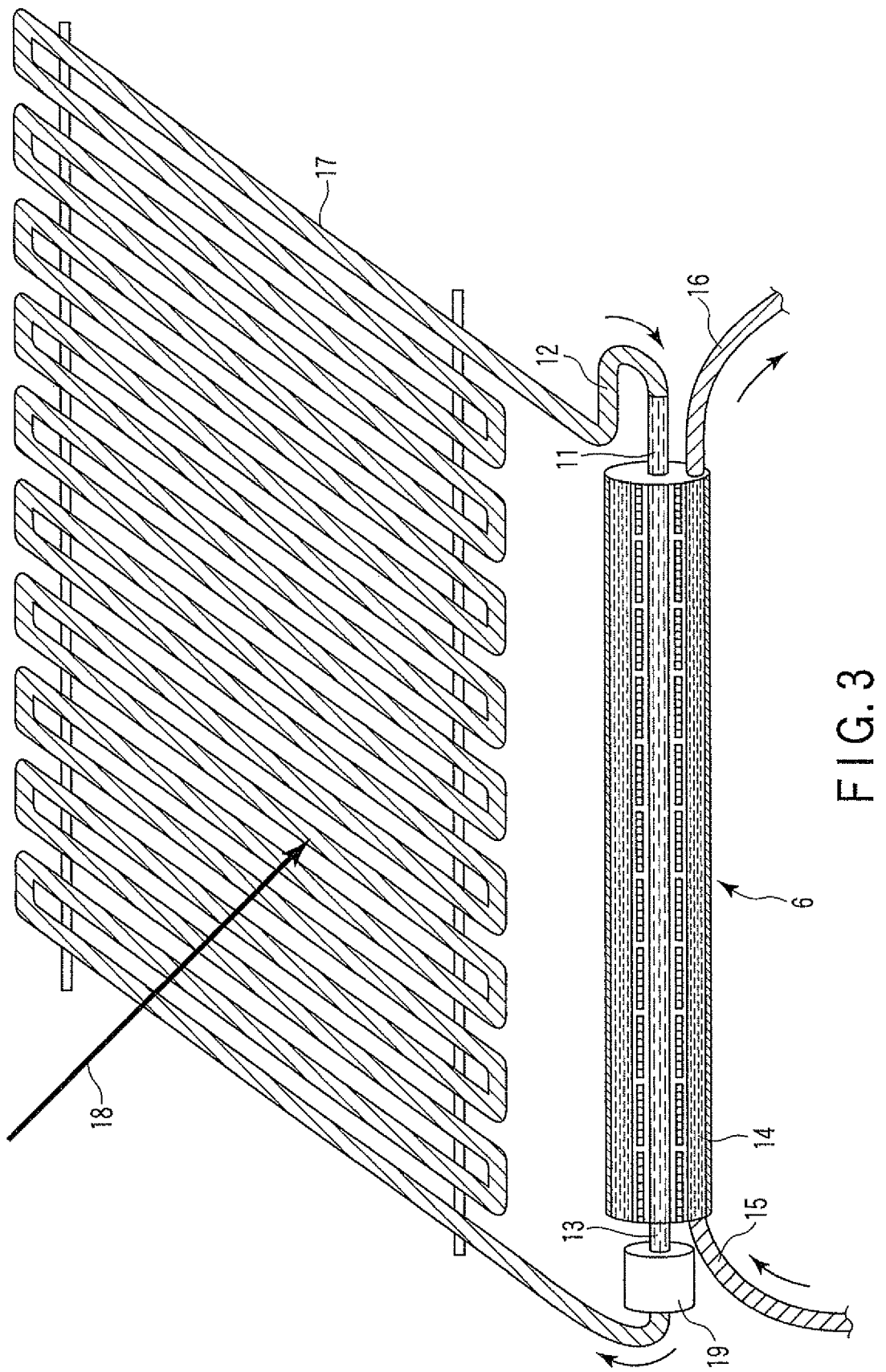
FIG. 3 is a schematic view of a temperature-difference thermionic power generation system using a solar heater.

FIG. 3 is a schematic view of temperature-difference thermionic power generating equipment using a solar heater. A heat collecting pipe 17 of a solar heater stretched around the surface of the deck is irradiated with a sunlight 18 to be a warm water 11 which is circulated in the heat collecting pipe 17, introduced from a high-temperature liquid port 12 of the temperature-difference thermionic generator 6 and then discharged from a high-temperature liquid outlet port 13. Then, the warm water 11 is returned to the heat collecting pipe of the solar heater through a circulating pump 19. On the other hand, a cool water 14 including deep ocean water or surface ocean water is introduced from a cold water port 15 and discharged from a cold water discharge port 16. Thermionic power generation is accomplished by a temperature difference between the high-temperature liquid 12 and the cold water 14.

FIG. 4 is a schematic view of a temperature-difference thermionic power generation system using a cylinder type spherical mirror. A cylinder type spherical mirror 20 is set as a light incident skylight introducing light as a light source of photosynthesis in the vegetable plant and is provided with a cold filter film 23 which transmits visible rays 21 and reflects light having a wavelength 22 of 800 nm or more. Here, this film is applied to the room side so that the outside air surface side glass surface can be easily washed with water though this film may be applied to the outside air side or the room side. The cylinder type spherical mirror 20 is manufactured by the method disclosed in Jpn. Pat. Appln. KOKAI Publication No. 53-5647 by the inventors of the patent application of this case. The visible rays having a wavelength of 800 nm or less among the incident sunlight 18 is transmitted through the skylight 20 and used for the photosynthesis of vegetables. A heat ray 22 reflected by the cold filter film 23 is converged to a heat collecting pipe 24 arranged on the focus line of sunlight and the high-temperature liquid 11 such as hot water and hot oil heated by heat conversion using sunlight is circulated in the heat collecting pipe 24, is introduced from the high-temperature liquid introduction port 12 of the temperature-difference thermionic power generating equipment 6, discharged from the high-temperature liquid discharge port 13 and then returned to the heat collecting pipe 24 through the circulating pump 19. The cold water 14 including deep ocean water or surface ocean water is introduced from the cold introduction port 15 and discharged from the cold water discharge port 16. Thermionic power generation is accomplished by a temperature difference between the high-temperature liquid 12 and the cold water 14. For the tracking of sunlight, each flapping angle of the four corners of the skylight 20 (mirror with a cylindrical mirror surface) is given by an operating device 25 controlled by a computer. The heat rays 22 which are the reflected light are always ray-converged to the heat collecting pipe 24. With regard to the light to be used for the photosynthesis in the vegetable plant, the quantity of light and irradiation position are not almost changed because a meniscus structure lens is used.

FIG. 5 is a schematic view of a temperature-difference thermionic power generation and a solar battery power generation system using a strip type plane mirror. A plane glass plate 26 is placed as a skylight for incident of light as a light source for photosynthesis in the vegetable plant and a strip-like mirrors 27 provided with a cold filter film which reflects heat rays having a wavelength of 600 nm or more and transmits light having a wavelength less than 600 nm are arranged in parallel on the plane glass plate 26. A flapping angle is set to each strip by a flapping angle operating device controlled by a computer, and the incident sunlight 18 is reflected on each strip type plane mirror 27, converged to the focus line surface and forms high-density light. Here, a solar battery array 28 is arranged, and a strip-like two-axis concave mirror 29 with a cold filter which reflects light having a wavelength of 800 nm or more is stuck to the front surface of this solar battery array 28 and a radiator 30 (cooling water) is attached to the backside of the solar battery array 28.

The electric power of this solar battery power generation is supplied to a part of the electric power of the integrated production factory. The infrared rays 31 which are reflected on the strip-like two-axis concave mirror 29 with a cold filter form parallel rays and are converged to the heat collecting pipe 24 placed on the center of the plane glass plate 26. The high-temperature liquid 11 such as hot water and hot oil heated by heat conversion using sunlight is circulated in the heat collecting pipe 24, introduced from the high-temperature introduction port 12 of the temperature-difference thermionic power generating equipment 6, discharged from the high-temperature discharge port 13, and set back to the heat collecting pipe 24 through the circulation pump 19. The cold water 14 including deep ocean water or surface ocean water is introduced from the cold introduction port 15 and discharged from the cold water discharge port 16. Thermionic power generation is accomplished by a temperature difference between the high-temperature liquid 12 and the cold water 14. In the method in which electric power is obtained from a solar battery like that of this embodiment, it is necessary to irradiate the solar battery with light having a wavelength of 600 to 750 nm and therefore, light having a wavelength of 600 to 800 nm is supplemented by artificial light in the culture of vegetables according to the need.

Figure 6:
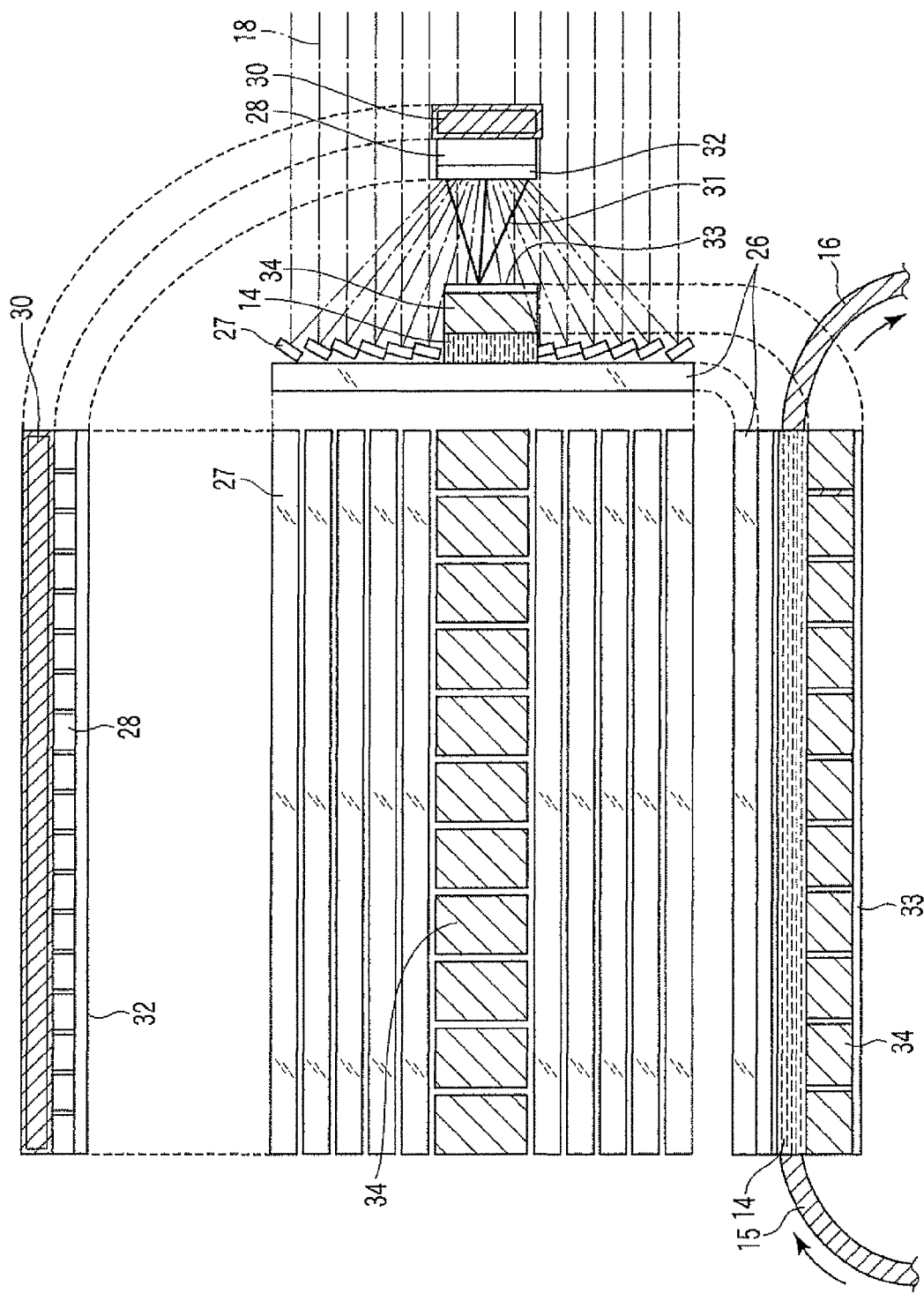
FIG. 6 is a schematic view of a high thermionic power generator and a solar battery power generation system using a strip type plane mirror.

FIG. 6 is a schematic view of a high thermionic power generation and a solar battery power generation system using a strip type plane mirror. A plane glass plate 26 is placed as a skylight for incident of light as a light source for photosynthesis in the vegetable plant and strip-like mirrors 27 provided with a cold filter film which reflects heat rays having a wavelength of 600 nm or more and transmits light having a wavelength less than 600 nm are arranged in parallel on the plane glass plate 26. A flapping angle is set to each strip mirror by a flapping angle operating device controlled by a computer, and the incident sunlight 18 is reflected on each strip type plane mirror 27, converged to the focus line surface and forms high-density light. Here, a solar battery array 28 is arranged, and a cold filter film 32 which reflects light having a wavelength of 800 nm or more is vapor-deposited on the front surface of the solar battery array 28 and a radiator 30 (cooling water) is attached to the backside of the solar battery array 28. The electric power of this solar battery power generation is supplied to a part of the electric power of the integrated production factory. The infrared rays 31 which are reflected on the cold filter film 32 are further converged to conduct about 500° C. heat to the high-temperature thermionic thermoelement 34 through the heat collecting plate 33 placed on the center of the plane glass plate 26. The cold water 14 is introduced from the cold water introduction port 15 into the backside of the high-temperature thermionic thermoelement 34 and discharged from the cold water discharge port 16. Thermionic power generation is caused by the temperature difference between the heat collecting plate 33 and the cold water 14. In the method in which electric power is obtained from a solar battery like that of this embodiment, it is necessary to irradiate the solar battery with light having a wavelength of 600 to 750 nm and therefore, light having a wavelength of 600 to 800 nm is supplemented by artificial light in the culture of vegetables according to the need.

FIG. 7 is a view of a production process diagram in the electrolytic plant. A sea water 35 having a salt content of about 3% such as deep sea water and surface sea water is pumped by a storage pump and the sea water to which high pressure is applied is allowed to pass through a reverse osmosis membrane 36 to produce fresh water 37. Here, sodium oxalate or oxalic acid 39 produced in the ethanol plant 3 is poured into a brine 38 for the purpose of removing Ca in the brine 38 which has not been passed through the reverse osmosis membrane 36 and has a salt content of about 6% and in which NaCl, $MgCl_2$, $MgSO_4$, NaBr, $CaSO_4$, KCl, $MgBr_2$ and the like to precipitate and remove calcium oxalate ($CaC_2O_4$) 40. A hydrochloric acid 41 produced in the electrolytic plant 2 is poured into this calcium oxalate to recover oxalic acid 39 and concentrated $CaCl_2$ is subjected to molten salt electrolysis 42 to produce a metal calcium 43 and a chlorine 44. On the other hand, in order to make magnesium free from the filtrate 45 from which Ca has been removed, a caustic soda 46 produced in the electrolytic plant 2 is poured into the filtrate 45 to precipitate and remove magnesium hydroxide 47. The hydrochloric acid 41 produced in the electrolytic plant 2 is poured into the magnesium hydroxide to make magnesium chloride 41, which is then subjected to molten salt electrolysis 42 to produce metal magnesium 48. On the other hand, in order to remove sulfuric acid from the filtrate 49 from which Mg has been removed, the filtrate neutralized by the hydrochloric acid 41 produced in the electrolytic plant 2 is subjected to transmission/separation by using an ion exchange resin electrodialysis 50. On the other hand, a brine 51 having a salt content of about 20% is further concentrated to a salt content of 30% by heating and is then subjected to solution electrolysis 52 to produce caustic soda 46. A large part of this caustic soda 46 is further subjected to molten salt. electrolysis 42 to produce metal sodium 54, which is then stored in petroleum. An oxygen 55 is produced as a byproduct of this molten salt electrolysis 42. Also, in the solution electrolysis 52, chlorine 44, hydrogen 54 and oxygen 55 are produced. Chlorine gas 44 is reacted with hydrogen gas 54 to produce hydrochloric acid 41. On the other hand, a dilute sulfuric acid 57 removed by the electrodialysis 50 using an ion exchange membrane 36 is concentrated by the ion exchange resin to separate a concentrated acid 58 from a fresh water 37. A large part of oxygen gas 55 produced here is bubbled in the sea water from the culturing plant 5. Though oxalic acid or sodium oxalate 39 is poured into the brine 38 which has not been passed through the reverse osmosis membrane 36 here, the brine 38 may be first poured into sea water 35 to carry out calcium-removing treatment. If so, the amount of fresh water to be obtained through the reverse osmosis membrane 36 is increased and also, brine having a salt content of 6% or more can be obtained.

Figure 8:
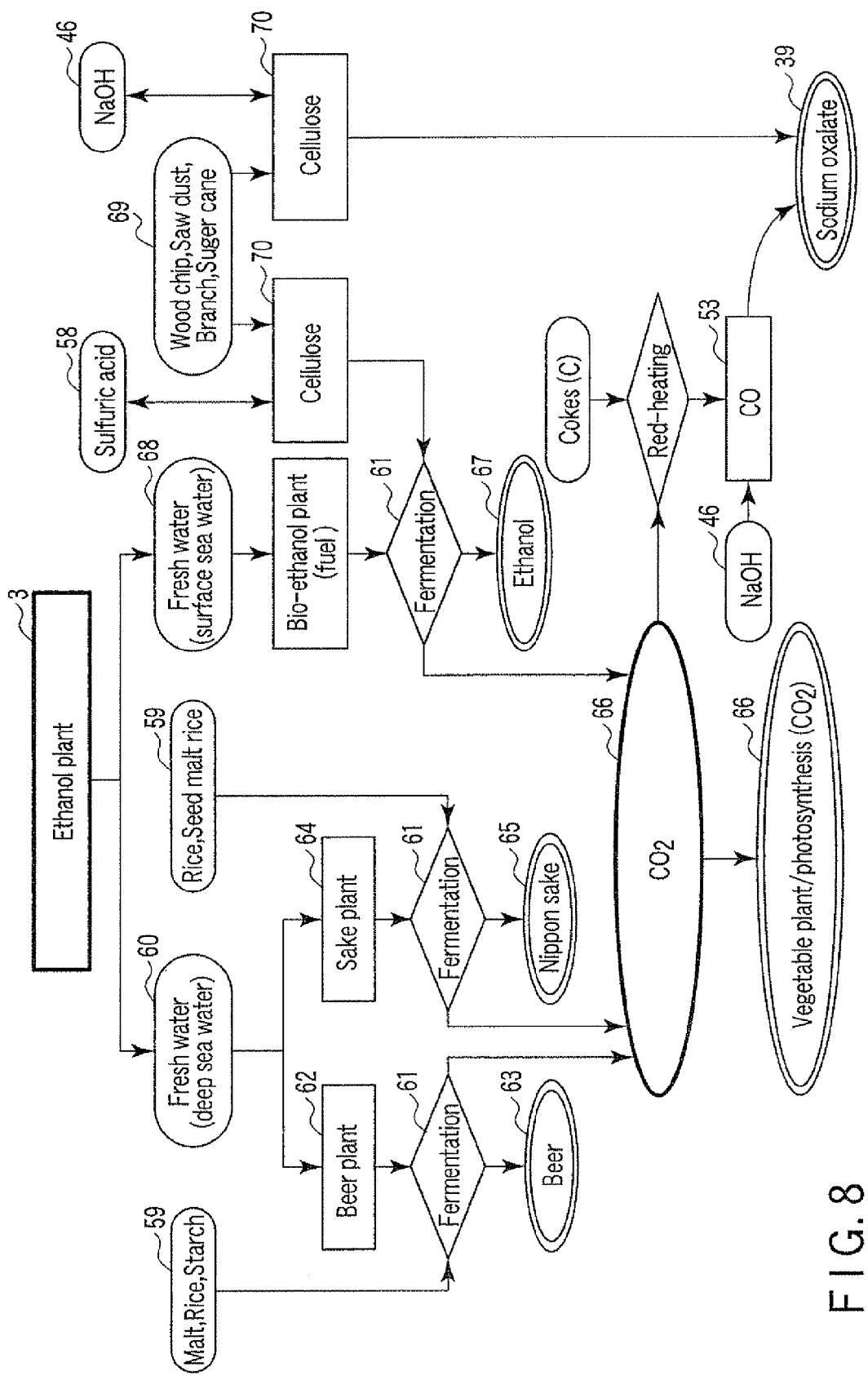
FIG. 8 is a production process diagram in a methanol plant.

FIG. 8 is a production process diagram in the ethanol plant. The major purpose of the ethanol plant 3 is to secure a large amount of carbon dioxide which is necessary and essential for photosynthesis in the vegetable plant 4 with the intention of furnishing the source of carbon dioxide by alcohol fermentation. A deep fresh water 60 obtained by desalinating deep ocean water by the reverse osmosis membrane pumped in the electrolytic plant 2 is used for, particularly, drinking beer and sake and brewing grains 59 such as landed malt, rice, mold starter, corn, starch and the like and particularly, starch is treated with yeast contained therein to convert starch into glucose, fructose, cane sugar, maltose or the like by amylase and maltase secreted from the yeast. Then, these sugars are subjected to an alcohol fermentation 61 made by an alcoholic decomposition enzyme zymase, thereby brewing deep sea water beer 63 in a beer plant 62 and deep water sake 65 in a sake plant 64. A carbon dioxide 66 generated by this alcohol fermentation 61 is supplied for the photosynthesis in the vegetable plant 4. On the other hand, a surface fresh water 68 obtained by desalinating surface ocean water pumped in the electrolytic plant 2 by a reverse osmosis membrane is used for this fuel bio-ethanol 67. The concentrated sulfuric acid 58 produced in the electrolytic plant 2 is added to a ligneous biomass such as landed wood, wood chip, branches, squeezed residues 69 of canes to solubilize a cellulose 70 and the solubilized cellulose is decomposed into sugars by a dilute sulfuric acid 58. The alcohol fermentation 61 is caused by an alcohol decomposition enzyme excreted from yeast to produce a bio-ethanol 67 through a distillation dehydration process. Here, the sulfuric acid 58 is recovered and reused. The carbon dioxide 66 generated by the alcohol fermentation 61 is supplied for the photosynthesis of vegetable plant 4. In the ethanol plant 3, on the other hand, sodium oxalate and oxalic acid 39 are produced as agents used to remove calcium in sea water in the electrolytic plant 2. Also, carbon dioxide generated by using the surface fresh water 68 obtained by desalinating surface ocean water pumped in the electrolytic plant 2 by a reverse osmosis membrane and by pouring caustic soda 46 manufactured in the electrolytic plant 2 into the landed wood/wood chip 69 or the like or carbon dioxide obtained by the alcohol fermentation, and carbon monoxide generated by red-heating cokes are absorbed by caustic soda to produce sodium oxalate 39, which is then used as an agent for removing calcium in the electrolytic plant 2.

FIG. 9 is a view of a production process in the vegetable plant 4. The main object of vegetable plant 4 is to provide a large amount of fresh vegetables to consumer places. However, it is important to supply oxygen to surface sea water poor in dissolved oxygen to suppress the generation of red tides, thereby eliminating ocean dead zones. For this, the oxygen gas generated by the photosynthesis in the vegetable plant 4 is returned to sea water from the culturing plant 5. Necessary elements in the vegetable production are a temperature, water, light, carbon dioxide and fertilizers for photosynthesis. As the water, the deep fresh water 60 and the surface fresh water 68 are used. In a plant 71 in the vegetable plant 4, it is important to secure water because a solution culture method 72 is used. A soil culture method 75 may be used in a coastal plant 73 and a land plant 74 adjacent to the seashore. The recovery 76 of fertilizers is also important to suppress such a phenomenon that fertilizers are washed away in sea water and that is one of the causes of deficiency of oxygen concentration in sea water. Because the culture circumstance is controlled by a computer in the vegetable plant, deep ocean water is supplied through a pipe and, according to the case, electric cooling is combined to limit the temperature of a vegetable room to 15° C. or less in the place where cold district vegetables or cold upland vegetables are produced, and the high-temperature liquid used in the temperature-difference power generation is supplied through a pipe to settle a growing circumstance kept at about 25° C. in the case of tropical vegetables. Electric cooling and a refrigerator are necessary to store harvested vegetables. In vegetable plant 4 utilizing fluid energy power generation using wind, tide and the like, vegetables can be produced day and night even in the weather with wind and rain. This is a perfectly controlled vegetable plant utilizing an artificial light 77 such as a fluorescent lamp and a light emitting diode without utilizing sunlight. Vegetables are made to proceed with photosynthesis 77 by light having a wavelength of 400 to 700 nm. There are a strong light reaction which is run by light having a peak at a wavelength of 430 nm and a peak at a wavelength of 630 nm and a weak light reaction which is run by light having a peak at a wavelength of 650 nm and a peak at, a wavelength of 700 to 750 nm, such as seed sprouting, flower differentiation, blooming, development of a cotyledon, chlorophyll synthesis and internode elongation. It is necessary to select the wavelength of the irradiation corresponding to the condition of growth. In order to exactly secure the irradiation 77 of light, the amount of carbon dioxide 66 to be supplied and also to always produce oxygen 55 generated when the irradiation of light is stopped, ON-OFF of the artificial light 77 and the installation of plural vegetables production rooms are necessary. It is possible to produce the vegetables 79 which are independent of climate and weather and need no labor by controlling by a computer the circumstance of the culturing of vegetables.

FIG. 10 is a production process diagram in the culturing plant. The main object of the culturing plant 5 is to make a fishery rich in nutrients and a fish preserve and an underwater reef where fish live which are rich in dissolved oxygen by supplying oxygen 55 generated in the vegetable plant to deep ocean water 90 pumped in the electrolytic plant by bubbling and by discharging (92) deep ocean water 90 on surface sea water 91. Also, the generation of red tides can be suppressed and the coastal area dead zones that are being spread in seashores and gulfs can be eliminated by increasing dissolved oxygen of the surface water by bubbling oxygen from the underwater. An oxygen discharge pipe extended to the fish preserve, to underwater reef where fish live, an to the bottom or middle of the sea is installed as a measures for dissolving oxygen in the sea water and a water-repellent porous film with atm of pore diameter is applied and stretched on the interface of the sea water at the gas outlet of the pipe. When 1 atm oxygen gas is sealed in the pipe, the oxygen gas puffs out by a water depth of 5 m, but the sea water flows backward to the pipe at a depth larger than 5 m. Therefore, an oxygen seal pressure higher than the pressure at which sea water flow backward is necessary. $\alpha$ is a pressure decided by the hole diameter of the porous film. Therefore, when $\alpha$ is set to 0.5 atm from the actual value obtained in the case where the pore diameter is 3 μm, it is necessary to apply a pressure of 2.5 atm or more $(1+1+\alpha)$ at a surface depth of 10 m, 11.5 atm or more $(1+10+\alpha)$ at a surface depth of 100 m and 31.5 atm or more $(1+30\alpha)$ at a surface depth of 300 m. When, in the offshore marine plant 71, oxygen 55 produced in the vegetable plant 4 is added to deep ocean water 90 pumped in the electrolytic plant 2 to discharge (92) deep ocean water 90 under the sea while taking this oxygen seal pressure and the sea depth of the pipe into account, this results in the formation of the natural underwater reef 94 for warm current fishes such as tunas, bonitos, mackerels and sardines in sea water having a temperature of 10° C. or more, and cold current fishes such as herrings, codfishes, trout and yellowtails and migratory fishes such as tunas, herrings and sauries in sea water having a temperature less than 10° C. The culturing 95 of fishes and the culturing 96 of shellfishes and crustaceans such as abalones and lobsters is carried out in a fish preserve with water 93 preserved at the ship bottom of the marine plant 71. When, in the coastal plant 73 located in a place where the sea bottom is relatively shallow, oxygen 55 produced in the vegetable plant 4 is added to deep ocean water 90 pumped in the electrolytic plant 2 to discharge (92) deep ocean water 90 to the sea bottom, this results in the formation of an underwater reef 97 for bottom water fishes such as flatfishes, codfishes and flounders. Yellowtails and tunas are cultured in a natural fish preserve 98 of which the surroundings are enclosed by a fence on the marine around the coastal plant 73, and shellfishes and crustaceans such as prawns and ormers are cultured in a ship bottom fish preserve 99. Eels and sweet fishes and the like are cultured by inland water culturing 100 in a fish preserve on a land plant 93.

FIG. 11 is a production process diagram in the electrolytic plant (II). In the electrolytic plant (I) shown in FIG. 7, first oxalic acid 39 is used to undergo a calcium-removing process. However, in this electrolytic plant (II), first magnesium is separated. Specifically, the sea water 35 having a salt content of about 3% such as deep sea water and surface sea water is pumped by a storage pump and the sea water to which high pressure is applied is allowed to pass through the reverse osmosis membrane 36 to produce fresh water 37. Here, in order to remove magnesium from the brine which has not been passed through the reverse osmosis membrane 36 and has a salt content of about 6% and in which NaCl, $MgCl_2$, $MgSO_4$, NaBr, $CaSO_4$, KCl, $MgBr_2$ and the like are dissolved, caustic soda 46 produced in the electrolytic plant 2 is poured into the brine to precipitate and remove magnesium hydroxide 47. Hydrochloric acid 41 produced in the electrolytic plant 2 is poured into this magnesium hydroxide to obtain magnesium chloride, which is then subjected to molten salt electrolysis 42 to produce metal magnesium 48 and chlorine gas 44. In order to remove sulfuric acid from the filtrate 49 from which magnesium has been removed, the filtrate neutralized by hydrochloric acid 41 produced in the electrolytic plant 2 is subjected to ion exchange resin electrodialysis 50 and the separated brine 51 having a salt content of about 20% is further thermally concentrated by heating to a concentration of 30%, followed by solution electrolysis 52 to produce caustic soda 46. A large part of this caustic soda 46 is further subjected to molten salt electrolysis 42 to produce metal sodium 54, which is then used in petroleum. Oxygen 55 is produced as a byproduct of this molten salt electrolysis 42. Also, in the solution electrolysis 52, chlorine 44, hydrogen 54 and oxygen 55 are produced. This chlorine gas 44 is reacted with hydrogen gas 54 to produce hydrochloric acid 41. On the other hand, sodium oxalate or oxalic acid 39 which is produced for the purpose of separating Ca in the ethanol plant 3 is poured into a mixture solution 101 of sulfuric acid and calcium sulfate removed by the ion exchange electrodialysis 50 to precipitate and remove calcium oxalate ($CaC_2O_4$) 40. Hydrochloric acid 41 produced in the electrolytic plant 2 is poured into this calcium oxalate to recover oxalic acid 39, and the concentrated $CaCl_2$ is subjected to molten salt electrolysis 42 to produce metal calcium 43 and chlorine 44. On the other hand, filtrate 45 and dilute sulfuric acid 58 from which Ca has been removed are concentrated by the reverse osmosis membrane 36 and separated into concentrated sulfuric acid 58 and fresh water 37. A large part of oxygen gas 55 is charged from a culturing plant in the sea water by bubbling.

Figure 12:
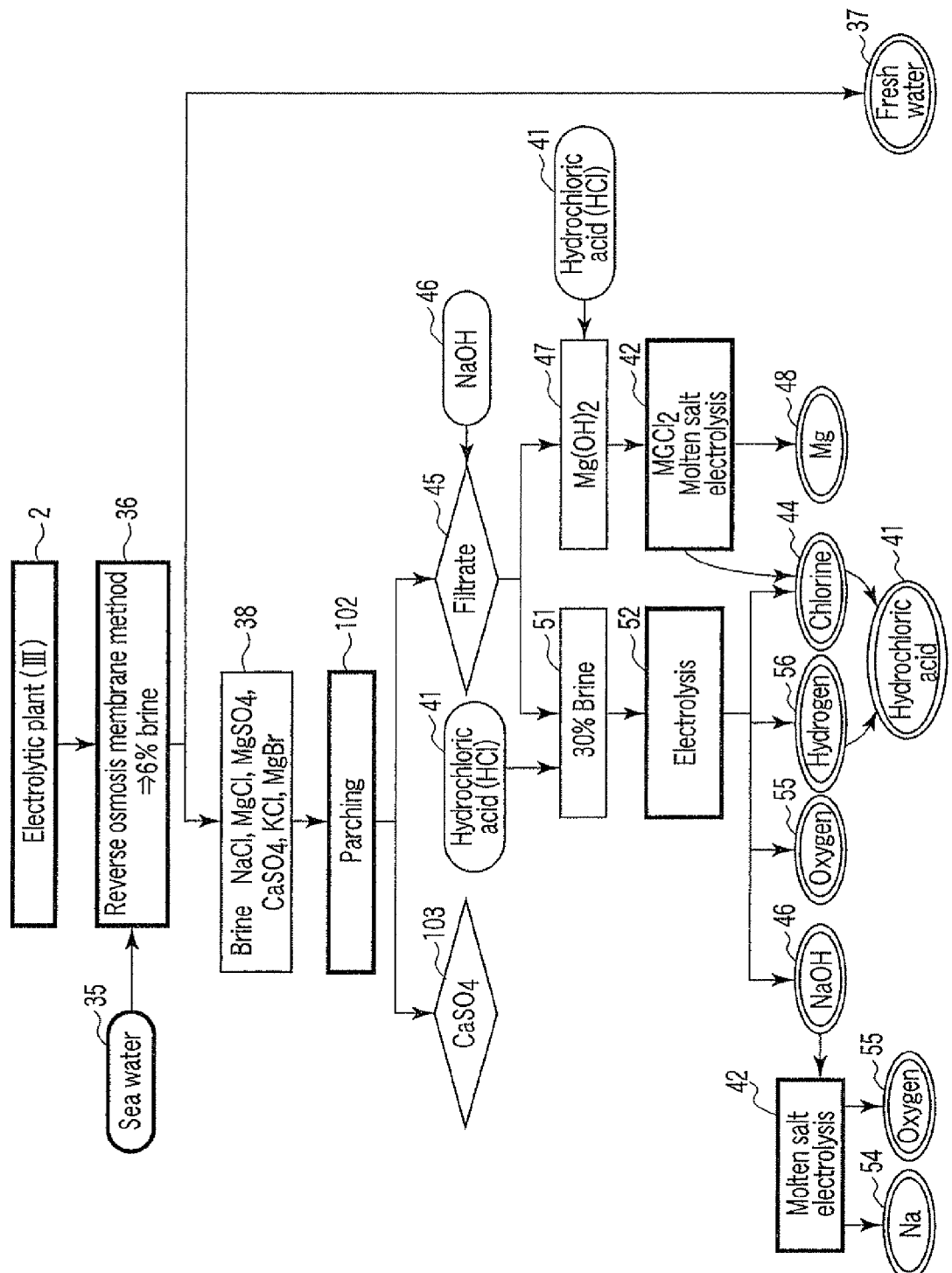
FIG. 12 is a production process diagram (III) in an electrolytic plant.

FIG. 12 is a production process diagram in the electrolytic plant (III). In electrolytic plant (I) shown in FIG. 7, first, oxalic acid 39 is used to undergo a calcium-removing process 40. However, in this electrolytic plant (III), the brine having a salt content of about 6% and removed by the reverse osmosis membrane method is parched (102) by the conventional salting process to isolate calcium sulfate based on a difference in solubility. Specifically, the sea water 35 having a salt content of about 3% such as deep sea water and surface sea water is pumped by a storage pump and the sea water to which high pressure is applied is allowed to pass through the reverse osmosis membrane 36 to produce fresh water 37. Here, the brine 38 which has not been passed through the reverse osmosis membrane 36 and has a salt content of about 6% and in which NaCl, $MgCl_2$, $MgSO_4$, NaBr, $CaSO_4$, KCl, $MgBr_2$ and the like are dissolved is parched (102) to remove calcium sulfate 103 which is first precipitated. In order to remove magnesium from the filtrate 45 from which Ca ions have been removed, caustic soda 46 which is produced in the electrolytic plant 2 is poured into the filtrate to precipitate and separate magnesium hydroxide 47. Hydrochloric acid 41 produced in the electrolytic plant 2 is poured into magnesium hydroxide 47 to produce magnesium chloride, which is then subjected to molten salt electrolysis 42 to produce metal magnesium 48 and chlorine gas 44. On the other hand, the NaCl/KCl mixture filtrate from which Mg has been removed is neutralized by hydrochloric acid 41 produced in the electrolytic plant 2 and brine 51 concentrated to about 30% is subjected to solution electrolysis 52 to produce caustic soda 46. A large part of this caustic soda 46 is subjected to molten salt electrolysis 42 to produce metal sodium 54, which is then stored in petroleum. Oxygen 55 is produced as a byproduct of this molten salt electrolysis 42. Also, in the solution electrolysis 52, chlorine 44, hydrogen 54 and oxygen 55 are produced. This chlorine gas 44 is reacted with hydrogen gas 54 to produce hydrochloric acid 41. A large part of oxygen gas 55 produced here is charged in the sea water by bubbling from the culturing plant 5.

Figure 13:
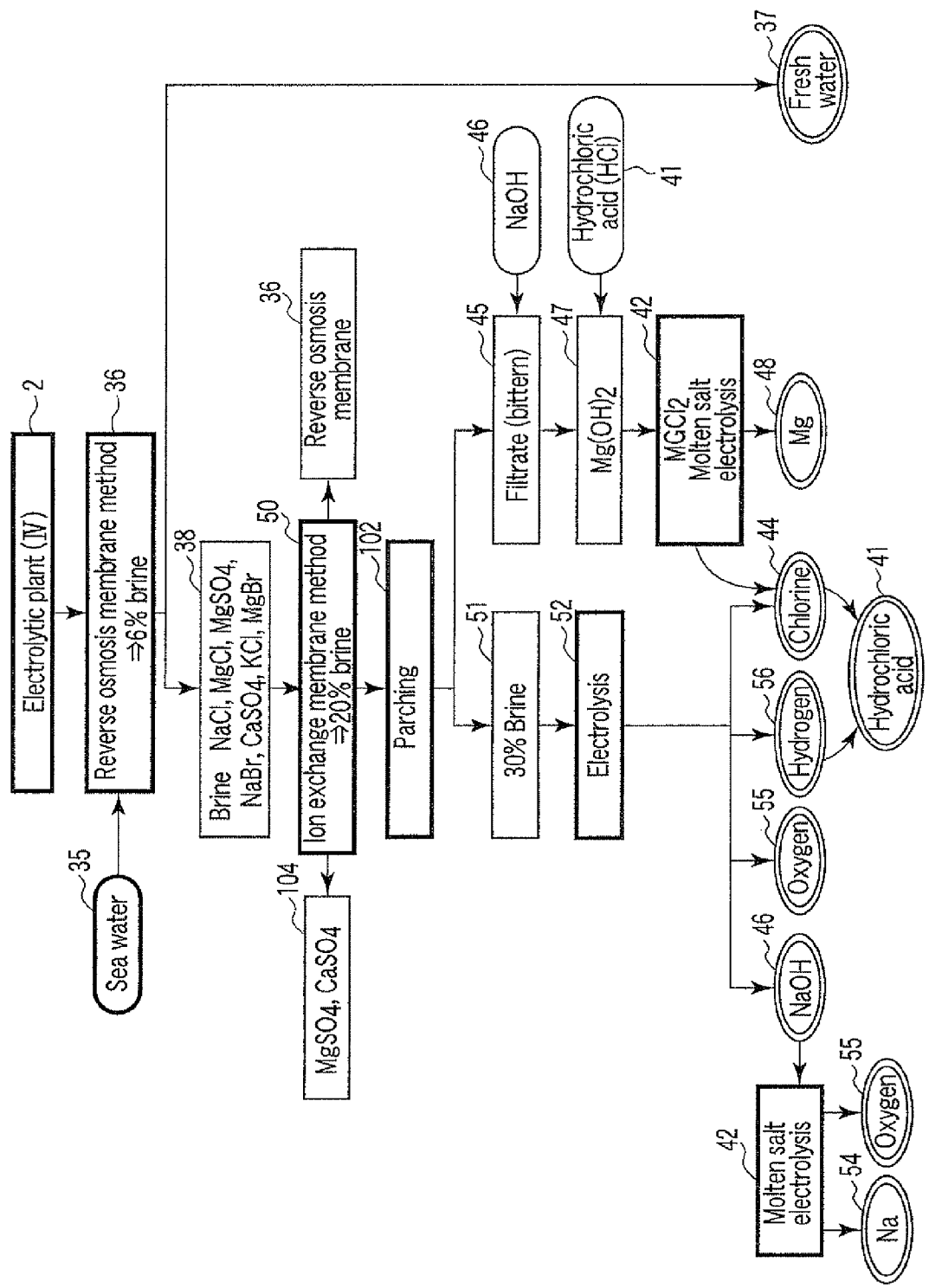
FIG. 13 is a production process diagram (IV) in an electrolytic plant.

FIG. 13 is a production process diagram in the electrolytic plant (IV). In electrolytic plant (I) shown in FIG. 7, first, oxalic acid 39 is used to undergo a calcium-removing process 40. However, in this electrolytic plant (IV), the brine having a salt content of about 6% and removed by the reverse osmosis membrane method is further concentrated by ion exchange resin electrodialysis 50 to prepare a concentrated brine having a salt content of about 20% and then, the concentrated brine is parched (102) by the conventional salting process to isolate a salt from magnesium. Specifically, the sea water 35 having a salt content of about 3% such as deep sea water and surface sea water is pumped by a storage pump and the sea water to which high pressure is applied is allowed to pass through the reverse osmosis membrane 36 to produce fresh water 37. Here, the brine 38 which has not been passed through the reverse osmosis membrane 36 and has a salt content of about 6% and in which NaCl, $MgCl_2$, $MgSO_4$, NaBr, $CaSO_4$, KCl, $MgBr_2$ and the like are dissolved is treated by ion exchange resin electrodialysis 50 to remove sulfuric acid ions, thereby removing magnesium sulfate and calcium sulfate 104. The brine which has a concentration of about 2% and is extracted from ion exchange resin electrodialysis 50 is made to pass through reverse osmosis membrane 36 to produce fresh water 37. On the other hand, the brine having a salt content of about 20% is parched (102) to prepare a brine 51 having a salt concentration of about 30%, which is then subjected to solution electrodialysis 52 to produce caustic soda 46. A large part of this caustic soda 46 is subjected to molten salt electrolysis 42 to produce metal sodium 54, which is then stored in petroleum. Oxygen 55 is produced as a byproduct of this molten salt electrolysis 42. Also, in the solution electrolysis 52, chlorine 44, hydrogen 54 and oxygen 55 are produced. This chlorine 44 is reacted with hydrogen gas 54 to produce hydrochloric acid 41. On the other hand, in order to remove magnesium from the filtrate 45 (bittern), caustic soda 46 produced in the electrolytic plant 2 is poured into the filtrate to precipitate and remove magnesium hydroxide 47, into which hydrochloric acid 41 produced in the electrolytic plant 2 is then poured to prepare magnesium chloride, which is then subjected to molten salt electrolysis 42 to produce metal magnesium 48 and chlorine gas 44. A large part of oxygen gas 55 produced here is charged in the sea water by bubbling from the culturing plant 5.

Figure 14:
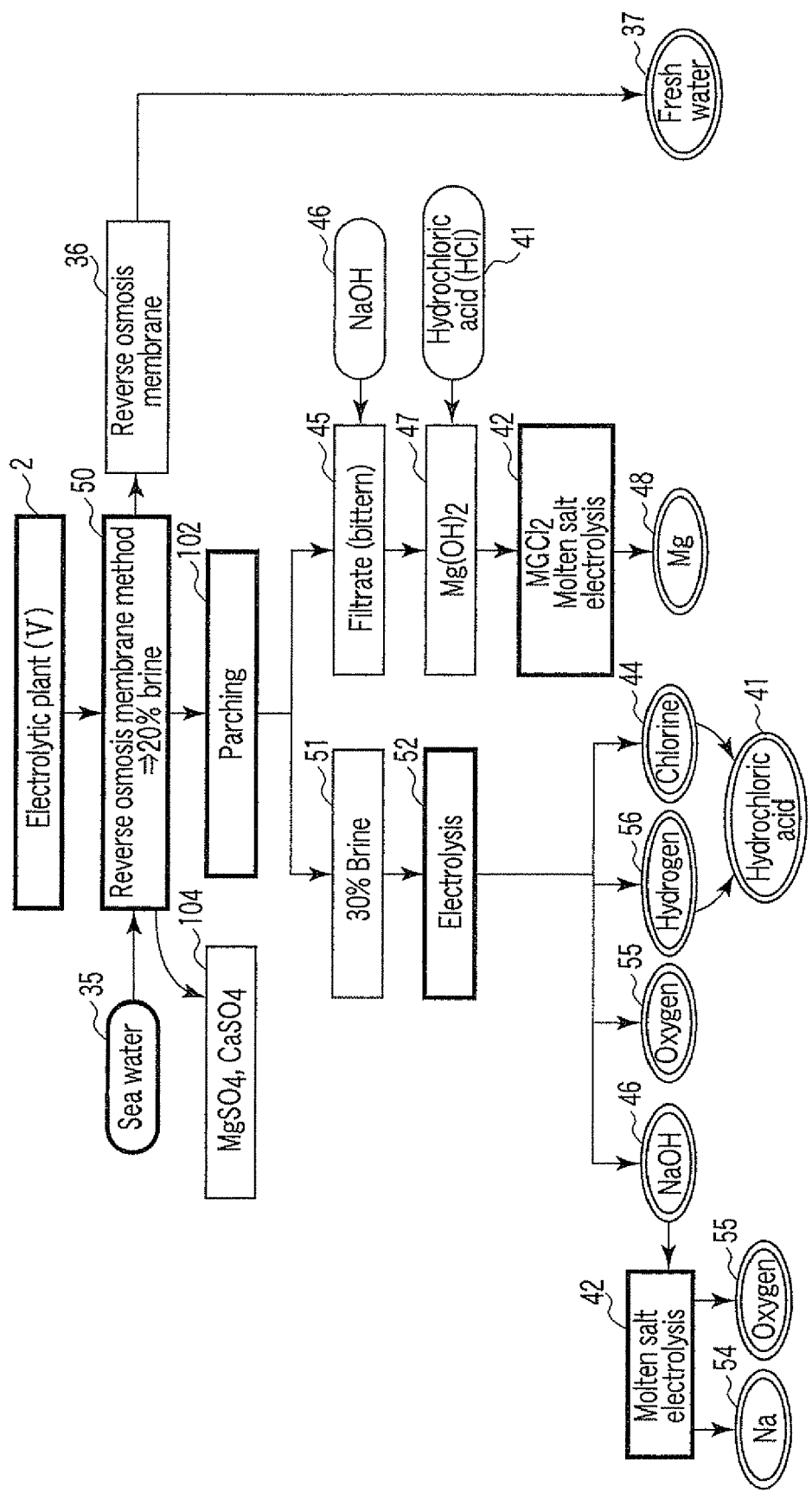
FIG. 14 is a production process diagram (V) in an electrolytic plant.

FIG. 14 is a production process diagram in the electrolytic plant (V). In electrolytic plant (I) shown in FIG. 7, first, oxalic acid 39 is used to undergo a calcium-removing process 40. However, in this electrolytic plant (V), first, sea water 35 is concentrated by ion exchange resin electrodialysis 50 to prepare concentrated brine having a salt content of about 20%, which is parched by the usual salt production method to isolate salt from magnesium. Specifically, the sea water 35 having a salt content of about 3% such as deep sea water and surface sea water is pumped by a storage pump and the sea water is treated by ion exchange resin electrodialysis 50 to separate sulfuric acid ions, thereby removing magnesium sulfate and calcium sulfate 104. The brine which has a concentration of about 2% and is extracted from ion exchange resin electrodialysis 50 is made to pass through the reverse osmosis membrane 36 to produce fresh water 37. On the other hand, the brine having a salt content of about 20% is parched (102) to prepare brine 51 having a salt concentration of about 30%, which is then subjected to solution electrodialysis 52 to produce caustic soda 46. A large part of this caustic soda 46 is subjected to molten salt electrolysis 42 to produce metal sodium 54, which is then stored in petroleum. Oxygen 55 is produced as a byproduct of this molten salt electrolysis 42. Also, in the solution electrolysis 52, chlorine 44, hydrogen 54 and oxygen 55 are produced. This chlorine gas 44 is reacted with hydrogen gas 54 to produce hydrochloric acid 41. On the other hand, in order to remove magnesium from the filtrate 45 (bittern), caustic soda 46 produced in the electrolytic plant 2 is poured into the filtrate to precipitate and remove magnesium hydroxide 47, to which hydrochloric acid 41 produced in the electrolytic plant 2 is then poured to prepare magnesium chloride, which is then subjected to molten salt electrolysis 42 to produce metal magnesium 48 and chlorine gas 44. A large part of oxygen gas 55 produced here is charged in the sea water by bubbling from the culturing plant 5.

FIG. 15 is a production process diagram in the electrolytic plant (VI). In electrolytic plant (I) shown in FIG. 7, first, sodium oxalate or oxalic acid 39 is used to undergo a calcium-removing process to precipitate calcium oxalate 40, to which hydrochloric acid 41 is added, and obtained calcium chloride 105 is subjected to molten salt electrolysis 42 to produce metal calcium. In this electrolytic plant (VI), calcium chloride 105 is used as an electrolytic bath temperature dropping agent for producing metal sodium. The sea water 35 having a salt content of about 3% such as deep sea water and surface sea water is pumped by a storage pump and the sea water to which high pressure is applied is allowed to pass through the reverse osmosis membrane 36 to produce fresh water 37. Here, in order to remove Ca in the brine 38 which has not been passed through the reverse osmosis membrane 36 and has a salt content of about 6% and in which NaCl, $MgCl_2$, $MgSO_4$, NaBr, $CaSO_4$, KCl, $MgBr_2$ and the like are dissolved, sodium oxalate or oxalic acid 39 which is produced in ethanol plant 3 is poured into the brine to precipitate and remove calcium oxalate ($CaC_2O_4$) 40. Hydrochloric acid 41 produced in the electrolytic plant 2 is poured into this calcium oxalate to recover oxalic acid 39 and concentrated calcium chloride 105 and sodium chloride 51 concentrated by ion exchange membrane 50 are respectively concentrated under heating. A mixture salt of about 60% of sodium chloride and about 40% of calcium chloride is subjected to molten salt electrolysis 42 carried out at about 600° C. Then, produced calcium-containing sodium is cooled (106) to 110° C. by utilizing the fact that the melting point (97.81° C.) is extremely lower than that (839° C.) of calcium, to separate metal sodium 54 from metal calcium 43 and metal sodium 54 is stored in petroleum. On the other hand, in order to make magnesium free from filtrate 45 from which Ca has been removed, caustic soda 46 is poured into filtrate 45 to precipitate and remove magnesium hydroxide 47. Hydrochloric acid 41 is poured into magnesium hydroxide 47 to make magnesium chloride, which is then subjected to molten salt electrolysis 42 to produce metal magnesium 48. On the other hand, sulfuric acid 57 which does not pass the ion exchange membrane 50 is concentrated by a reverse osmosis membrane and also distilled to produce concentrated sulfuric acid 58.

In an embodiment of the present invention, the integrated production factory 1 is a marine factory and has a structure of a floating body vessel. When the floating body vessel is moored in a sea area where the tidal current is faster, such as the Kuroshio area near Miyake island in Japan, a power generating system is installed in which wind wheel impeller is set to the surface of the floating vessel and a water wheel impeller is set to the underside of the floating vessel to thereby drive a power generator. Also, when the floating body vessel is fixed to a prescribed position by a mooring mechanism, a vertical rotation axis type wind or water wheel is used as the wind or water wheel. Two or more of these vertical rotation axis type wind or water wheels are installed on the floating body vessel. One wind or water wheel of a pair of wind or water wheels and the other are selected such that the directions of the rotations of the both are opposite to each other to drive the power generator by the rotation axis of each wind or water wheel. In this case, the turning forces in opposite directions cancel the reaction force which acts on the floating body vessel. Therefore, it is unnecessary to enforce the mechanical strength of the mooring mechanism for mooring the floating body vessel. Accordingly, because this floating body vessel can be installed not only in a sea area of shallows but also in a sea area having a relatively higher depth, it produces large economical effects. A marine integrated production factory can be made in which such a floating body vessel plant is used as a mother ship and deep ocean water plays a key role.

In another embodiment of the present invention, the integrated production factory shown in FIG. 1 is a marine factory utilizing a crude oil tanker. Marine wind force is converted into electric power by a vertical rotation axis type wind wheel. This integrated production factory is designed to be a nautical and open ocean factory using this electric power to produce fresh water, sodium, magnesium, calcium, potassium, caustic soda, chlorine, hydrochloric acid, sulfuric acid, hydrogen, oxygen and the like. Hydrogen produced in this factory is used for the fuel of the vessel. The marine factory is only constituted of the electrolytic plant and the ethanol plant, vegetable plant and culturing plant do not exist. For example, this factory leaves Japan and comes to anchor in East China Sea to produce fresh water and to unload the produced fresh water including Na, Mg, $Cl_2$ produced at the same time at a port of China. Then, after fresh water, Na, Mg, $Cl_2$ are again produced in South China Sea and the Indian Ocean and these products are unloaded at ports in the countries in the Middle East. Crude oil is filled in the fresh tank at ports in the Middle East and the factory returns to Japan. While the factory comes back to Japan, the storing of fresh water is limited and produced fresh water is electrolyzed to produce hydrogen, which is supplied for the fuel of the factory itself, and also, hydrochloric acid is produced from hydrogen and chlorine. Hydrogen and $Cl_2$ are unloaded at ports in Sri Lanka, Singapore, Manila or Taiwan. Then, in Japan, hydrogen, $Cl_2$, Na and Mg produced on the voyage and the petroleum are unloaded at ports. This factory is a trading ship type nautical and open ocean factory.

In a further embodiment of the present invention, the integrated production factory in FIG. 1 is a coastal factory and ocean wind force is converted into electric force by using a horizontal rotation axis windmill and a vertical rotation axis windmill. In the horizontal rotation axis windmill, the rotations of a pair of front and back propellers rotated reversely are connected directly to the rotor and stator of the generator and in the vertical rotation axis windmill, the rotations of a pair of vertical propellers rotated reversely are connected directly to the rotor and stator of the generator, ensuring that electric energy equivalent to a flow rate twice the actual flow rate can be extracted by their relative rotations. This coastal integrated production factory is the integrated production factory 1 including the electrolytic plant 2, ethanol plant 3, vegetable plant 4 and culturing plant 5 which use the electric power obtained by these windmills. If the coastal integrated production factory is located at Sweden, the following situation is considered. In Northern Europe, daylight hours are extremely short particularly in winter, and this is a hindrance to the growth of vegetables and, of course, to solar power generation. Particularly, Sweden forwards the post-petroleum policy and also, maintains the policy of post-nuclear power generation. Then, Sweden promotes the utilization of forests and therefore, energy crops are cultured in cultivated lands and unused lands to forward the generation of fuel and power generation using biomass. Abundant energy sources in Sweden are water and forests and sunlight cannot be expected. However, there is abundant wind force in Baltic Sea and particularly, in the vicinity of Gotland Islands. Because the seashore is shallow, not a floating structure but a structure having its foundation on the bottom of the sea is suitable to the integrated production factory 1. However, because the salt concentration of Baltic Sea is as low as 1%, imported rock salts may be used for the production of metal sodium. In light of this, fresh water, sodium, caustic soda, chlorine, hydrochloric acid, sulfuric acid, hydrogen, oxygen and the like are produced from surface sea water pumped from the electrolytic plant and the fresh water produced simultaneously is electrolyzed to produce hydrogen which is then fed to a coastal power generating plant through a pipeline. On the other hand, cellulose materials such as woods, branches and grasses produced on the land are treated with sulfuric acid and then fermented to brew bio-ethanol. Carbon dioxide generated in this alcohol fermentation is used for photosynthesis and the electric power obtained by the wind power generation is used to culture vegetables by using a light emitting diode or a fluorescent lamp as the light source. The oxygen generated in this photosynthesis is supplied to fish preserves and under reefs where fish live to culture fishes, and also, returned to sea water reduced in the concentration of oxygen to use it for suppressing the generation of a crown-of-thorns star and the generation of a red tide.

In a still further embodiment of the present invention, the integrated production factory in FIG. 1 is a land factory and ocean wind force is converted into electric power by using a horizontal rotation axis windmill and a vertical rotation axis windmill in the same manner as in the embodiment mentioned just before. Also, sunlight power generation and solar power generation may be utilized. High-density sunlight converged by a strip plane mirror which works as a convex mirror and an objective lens is introduced into a system provided with mirrors having a bandpass filter or cold filter film which transmit light having a wavelength range of 600 to 700 nm and reflects infrared rays having a wavelength higher than the above wavelength range, and a solar cell improved in power generation efficiency by cooling its back with sea water, and the infrared rays reflected on the bandpass filter are converged to thermionic power generation element are subjected to temperature-difference power generation using sea water as the cold source. Here, if the objective mirror which converges sunlight is provided with a cold filter film which transmits visible rays having a wavelength range of 600 nm or less and reflects the rays having a wavelength higher than the above wavelength range, the visible rays transmitted through the objective mirror are used for the photosynthesis in the vegetable plant. Warm water circulated in solar heater pipes stretched around the roof of the factory, hot oil or hot water circulated in a heat-collecting pipe arranged on the focus line of the sunlight converged by a ray-converging means such as a lens or mirror, or high-temperature liquids such as hot waste water or cooled oil in the electrolytic plant, and cool water consisting of pumped deep sea water or surface ocean water are made to flow in the inner tube and outer tube of triple pipe structure respectively and a semiconductor thermionic power generation elements are arranged between these inner and outer tubes to obtain temperature-difference power generation. Also, converged sunlight is applied to one surface of a thermionic power generation element through a heat absorbing layer and sea water is made to flow on the other surface to obtain temperature-difference power generation. Then, the electric power obtained by solar power generation such as above temperature-difference power generations and by the windmill is used to operate the integrated production factory 1 including the electrolytic plant 2, the ethanol plant 3, the vegetable plant 4 and the culturing plant 5. Because the factory is installed on the land near the seashore, a soil culturing 75 can be accomplished in the vegetable plant 4. Here, it is supposed that the factory is installed on Iki. Fresh water, caustic soda, hydrogen, chlorine, hydrochloric acid, sulfuric acid, hydrogen chloride, magnesium, sodium and the like are produced there from surface sea water pumped in the electrolytic plant. On the other hand, malts and wood chips produced on the land are fermented to brew deep sea water beers and bio-ethanol. Carbon dioxide generated in this alcohol fermentation is used for photosynthesis to culture open-field vegetables and oxygen generated in this photosynthesis is supplied to a fish preserve and under reef where fish live to culture fishes.

The metal sodium produced in the electrolytic plant 2 or metal sodium produced from a rock salt and salts of salt lakes are transported, as it is stored in a petroleum container, to power generation stations, city gas factories or factories for charging fuel cells or the like, and reacted with water to generate a large amount of hydrogen instantly according to the need. It is therefore unnecessary to fill it in a heavy bomb in a liquid state to transport it by land unlike hydrogen obtained by the electrolysis of water. For this, the cost of transportation can be reduced and the residual caustic soda can be supplied as the raw material for soda industries. Particularly, in mass-consumption places such as a power generation station, soda industries may be established around the power generation station. Moreover, if nuclear fuel used in an atomic power plant is replaced with metal sodium, effects on both of the stable supply of raw material and safety can be expected. It must be considered that the fuel wastes from the power generation station is the starting material of soda industries. Though, on the other hand, metal magnesium which can produce hydrogen by reacting with hot water is produced by the molten salt electrolysis in the same manner as in the case of metal sodium, the amount of magnesium to be produced from sea water is as small as 11.2% of that of sodium. If this metal magnesium is used as a hydrogen-generating source, it entails an enormous cost further to reduce an oxide which is the residue of magnesium. In the mean time, a metal sodium residue after hydrogen is produced can be used as the raw material for soda industries as it is. An endless fuel cycle can be constructed by producing metal sodium by subjecting this residue caustic soda again to the molten salt electrolysis. Therefore, if metal sodium is specialized as a material for generation of hydrogen and metal magnesium is used as a light metal alloy material, the both respectively have a far-reaching economical effect.

Figure 16:
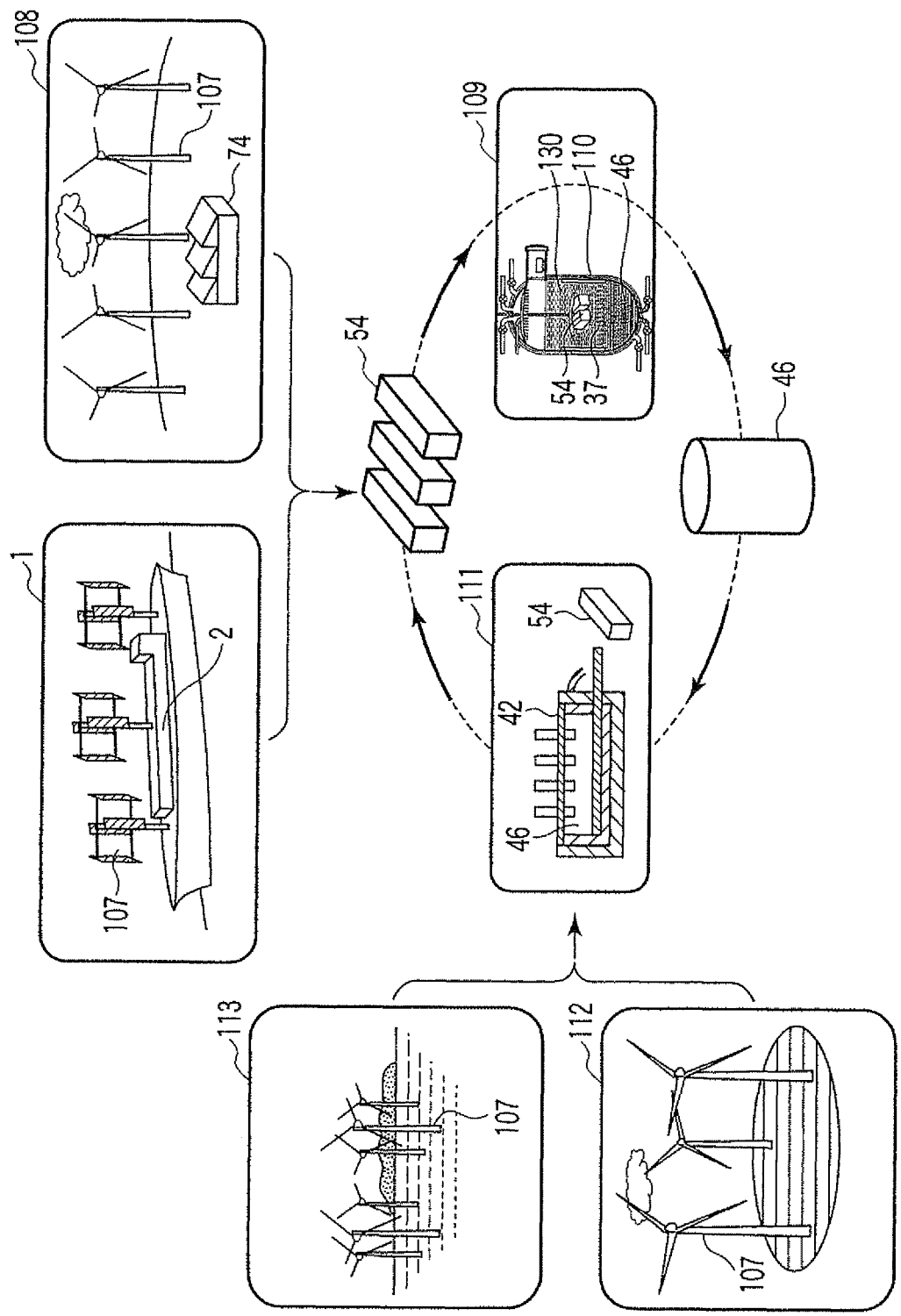
FIG. 16 is a metal sodium fuel cycle system diagram.

FIG. 16 is a metal sodium fuel cycle system diagram. A salt is extracted from sea water pumped at that place in the marine integrated production factory 1 floated on the ocean. Then, the salt is subjected to molten salt electrolysis 42 by the electric power obtained by wind power generation 107 on the deck to produce metal sodium 54. Or, in a metal sodium production facility 108, a rock salt is subjected to molten salt electrolysis 42 by the electric power obtained by wind force power generation 107 in the vicinity of a rock salt area to produce metal sodium 54. This metal sodium is transported to a hydrogen power generation station 109, where fresh water 37 is poured into metal sodium 54 in a hydrogen generator 110, the generated hydrogen gas 56 is burned to generate electricity, and caustic soda 46 generated as a waste is fed to a sodium regenerating plant 111. The caustic soda 46 is subjected to molten salt electrolysis (in the caustic soda electrolytic plant 112 by the power obtained in the land wind force power generation facility 112 or a coastal wind force power generation facility 113 in the vicinity of the regenerating plant to reproduce metal sodium, which is then used for hydrogen power generation fuel.

Figure 17:
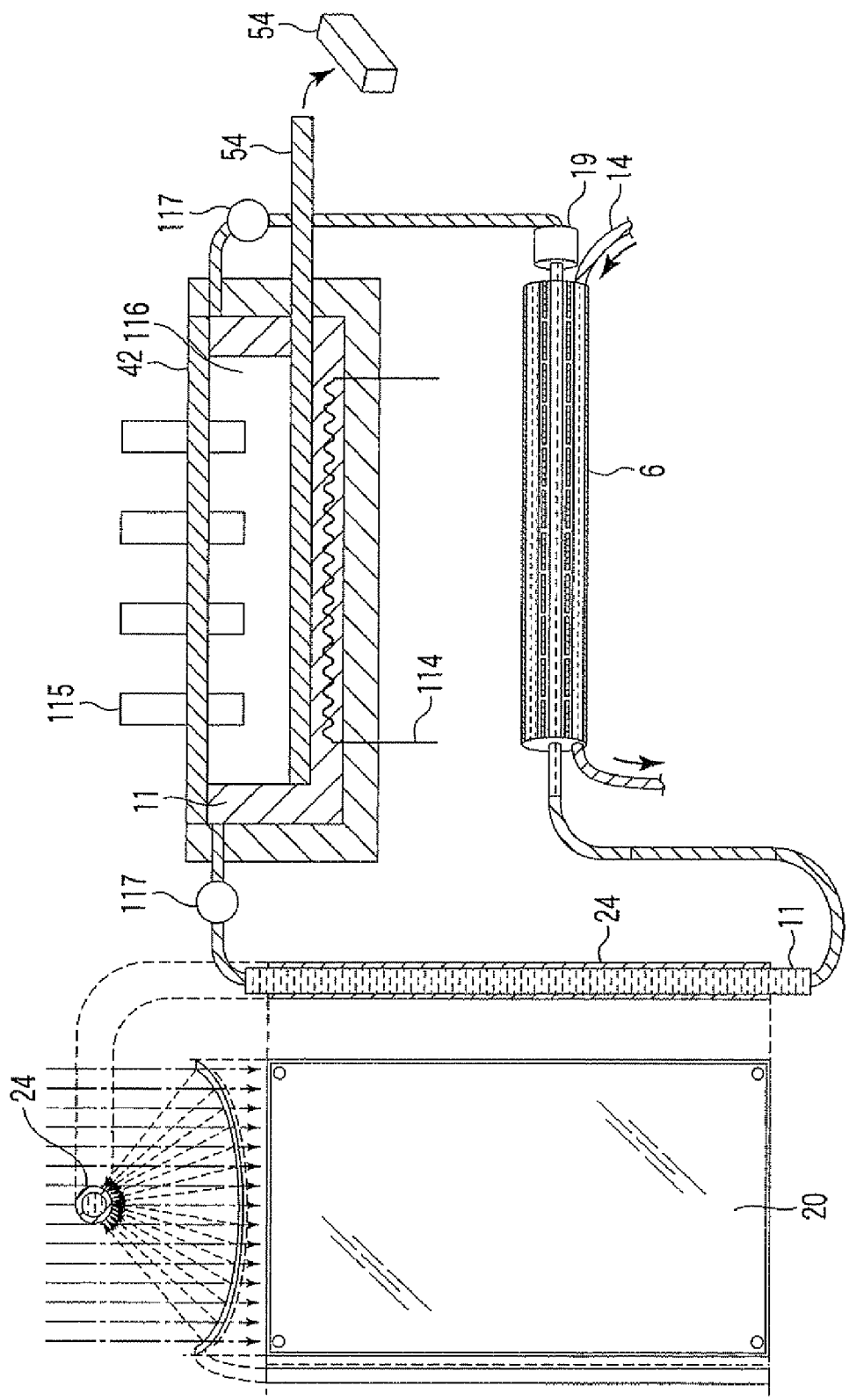
FIG. 17 is a molten salt preheating auxiliary system diagram for molten salt electrolysis utilizing sunlight.

FIG. 17 is a molten salt preheating auxiliary system diagram for molten salt electrolysis utilizing sunlight. Using temperature-difference power generation system (FIG. 4) using a cylinder type spherical mirror. A high-temperature liquid 11 constituted of light gas oil or an easily meltable metal such as sodium or potassium as a heating medium circulated in a heat collecting pipe 24 installed on the focus line of sunlight converged by the cylinder type spherical mirror 20 is made to flow in a molten salt electrolysis furnace 42 and current is made to flow across an electrode 115 in the condition that the molten salt 116 is preheated and further heated by electric elements 114 to undergo molten salt electrolysis, thereby producing metal sodium 54. Furthermore, temperature-difference power generation is conducted by a temperature-difference thermal power generating system 6 having a structure in which these waste heating mediums and cool water 14 constituted of pumped deep sea water or surface ocean water are made to flow in the inner tube and outer tube of a double or triple pipe structure respectively and semiconductor thermionic power generation elements are arranged between these inner and outer tubes. Then, the heating medium is again fed to the heat collecting pipe 24 of a sunlight heating collecting device by a circulating pump 19. When no sunlight is expected, a shield valve 117 is closed to stop the circulation of the heating medium.

Figure 20:
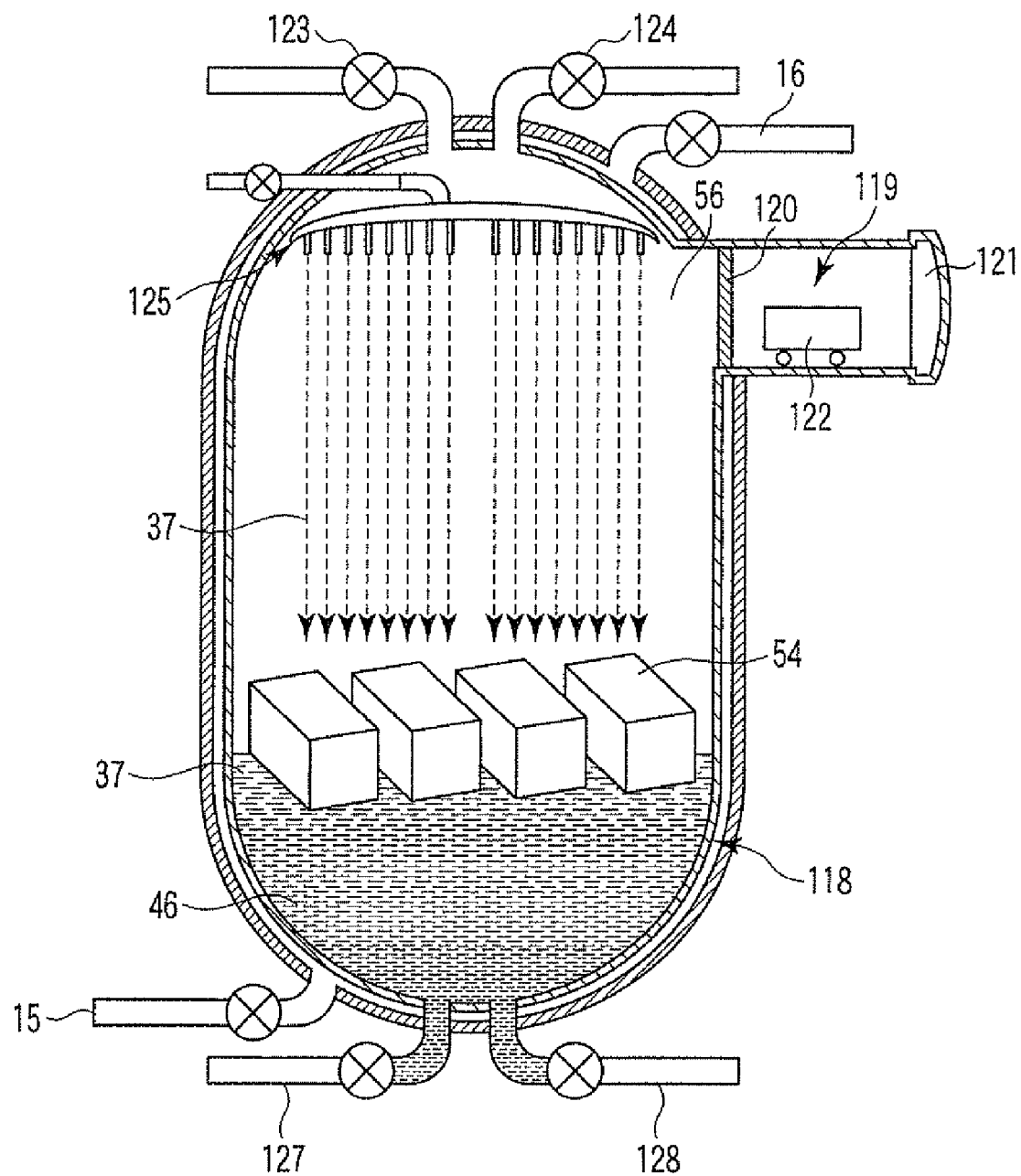
FIG. 20 is a steam power generation heat collecting container utilizing reaction heat.
Figure 21:
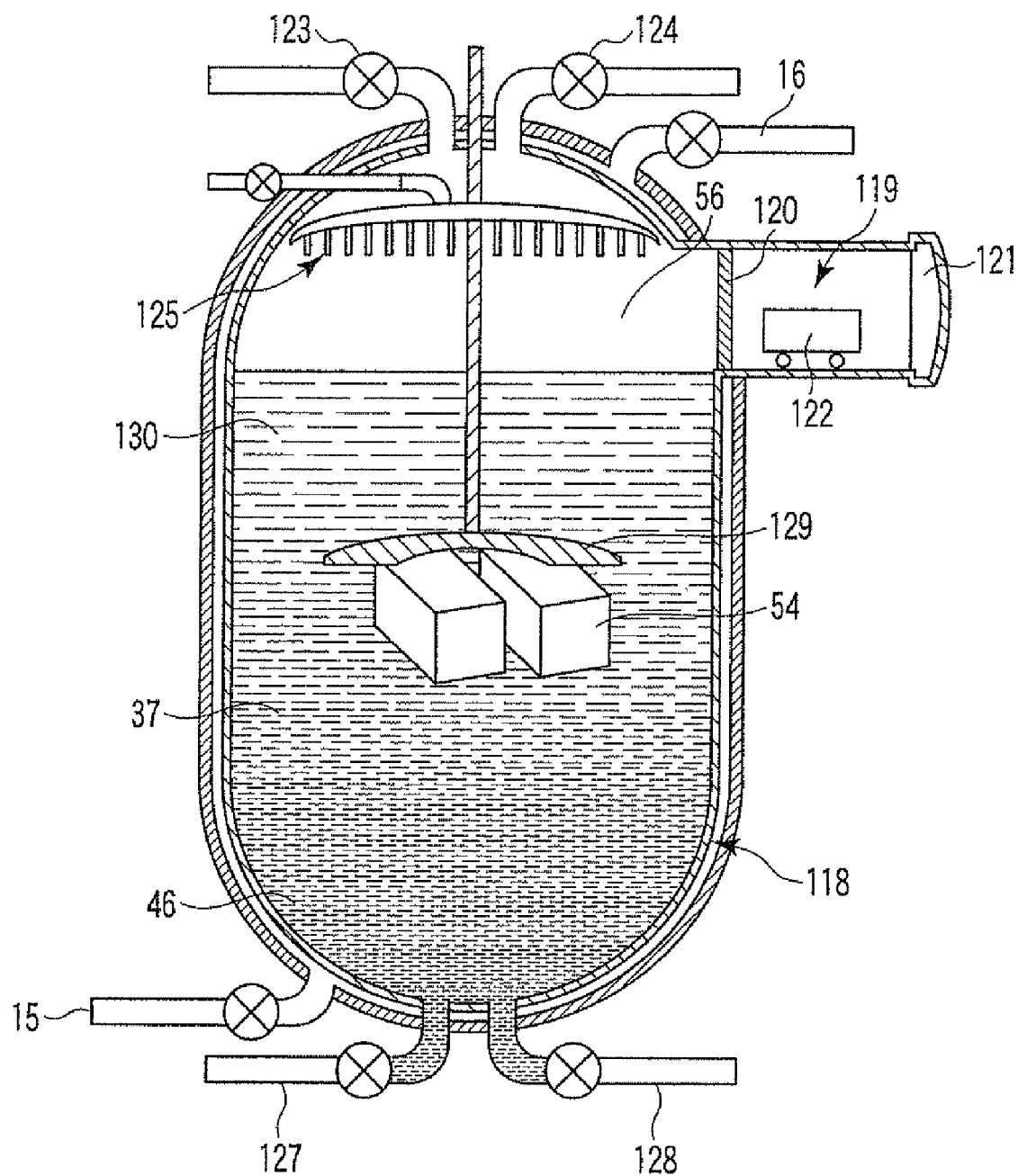
FIG. 21 is a schematic view of hydrogen generating equipment which no oil exists.

FIG. 18 is a schematic view of a hydrogen generator. This hydrogen generator is an apparatus used to react water with a metal sodium safely either in oils such as light gas oil or kerosene or in a dried atmosphere of gas such as hydrogen, argon or nitrogen. This hydrogen generator 118 is made of a stainless reactor and is provided with a metal sodium introduction door 121 having a shutter 120 isolating the reactor from a pre-room 119 on the upper part of the reactor and also with an introduction door 122 which continuously supplies metal sodium which is fuel protected by the oil on the upper port of the reactor. A hydrogen gas discharge port 123, a gas seal port 124 for hydrogen, argon or nitrogen and a nozzle 125 that supplies water by spraying, instillation or pulse-wise addition are disposed on the ceiling part of the inside wall of the hydrogen generator 118. A ultrasonic vibrator 126 is disposed on the periphery of the inside wall of the reactor, and an aqueous caustic soda solution discharge valve 127 and an oil discharge valve 128 are disposed on the bottom of the reactor. Moreover, a control bar 129 for pushing metal sodium contained in the oil phase, down to the water phase. The densities of sodium, water, caustic soda and hydrogen relating to the reaction in this reactor are as follows: hydrogen: 0.09, light gas oil: 0.8, metal sodium: 0.97, water: 1.0, and caustic soda: 2.13. The materials in the reactor are vertically disposed in the order of specific gravity from the bottom of the reactor as follows: caustic soda is heaviest and collected at the lower layer in the reactor, water is collected on the caustic soda, sodium is collected on the water, a light gas oil is floated on the sodium, and finally, the lightest gas hydrogen is disposed on the light gas oil. Taking these natures into account, a water phase is formed on the aqueous caustic soda solution and the light gas oil phase is formed on the water phase, wherein metal sodium is not in contact with water but is floated safely in the light gas oil and the produced hydrogen gas is collected on the light gas oil layer by comparatively increasing the amount of the light gas oil. It becomes easy to control a chemical reaction like this by utilizing a small difference in specific gravity. Metal sodium 54 and light gas oil 130 are put in the reactor 118. When water 131 is poured into the reactor 118 from a nozzle 125 disposed above, a part of fresh water 37 passing through the light gas oil 130 is brought into contact with the metal sodium 54 to undergo a reaction, thereby producing hydrogen gas 56, which then rises through the light gas oil 130. The hydrogen gas 56 is discharged from a hydrogen gas discharge port 123 to the outside of the system and recovered. On the other hand, caustic soda 46 which is another reaction product is sunk to the bottom of the container and recovered from the discharge valve 127 to the outside of the reaction system. In order to control the quantity of reaction of water with metal sodium, the reaction becomes more violent when water is supplied in the atomized state from the nozzle 125 and is added dropwise in the case where the reaction is mild. When pressure is applied to spray water or water is sprayed pulse-wise, the reaction becomes more violent. However, in any case, the poured water is not all reacted and therefore, the water phase 131 and the light gas oil phase 130 are stirred by a ultrasonic vibrator 126 to bring a mixture solution of oil and water into contact with metal sodium, thereby activating the reaction of water with metal sodium. Moreover, in order to cause a direct reaction with water, metal sodium 54 floated in the oil phase may be pushed down by the control bar 129 to react directly with the water phase 37 under the oil phase 130. If water is reacted with sodium in the condition free of oils, the most violent reaction is expected. For this, (to protect metal sodium from humidity, dry inert gas such as argon or nitrogen, hydrogen gas or the like is introduced from a gas seal port 124 and sealed in the reactor 118 and at the same time, the oils 130 such as light gas oil in the reactor 118 are excluded by the oil discharge valve 128. Under this condition, water is supplied by spraying, instillation or pulse-wise addition in metal sodium 54 from the nozzle 25 to recover hydrogen gas 56 from the hydrogen gas discharge port 123 at the ceiling part of the reactor and to recover caustic soda 46 from the of the aqueous caustic soda solution discharge valve 127 at the bottom part of the reactor. Or, metal sodium 54 may be poured in the condition that fresh water 37 is filled in the reactor. Also, a cooling jacket is provided on the outside periphery of the reactor and cooling water is circulated through cooling water charge and discharge ports 15 and 16 when a rise in temperature is sharp because of reaction heat. This reaction heat may be utilized for steam power generation as shown in FIG. 20. When the amount of water 37 to be supplied to metal sodium 54 is small, that is, when water is added to metal sodium from the water spray nozzle 125 located on the upper part of the reactor after the oil is withdrawn, the temperature becomes higher by the reaction heat and reaches a temperature higher than the flash point (500° C.) of produced hydrogen. Particularly, when oxygen is poured into the reaction system from the gas seal port 124 into the reaction system, hydrogen is burned to raise the temperature of the system. In order to utilize this heat, a heating medium 11 as a primary cooling agent is circulated in the cooling jacket 118 through the heating medium discharge port 16 and the heating medium charge port 15 to boil water as a secondary cooling water (though not shown) to rotate a steam turbine, making it possible to supply electric power. When the amount of water to be supplied to metal sodium is large on the other hand, and, specifically when metal sodium 54 floated in the oil layer 130 is pushed down from above by the controller 129 to react a large amount of water 37 under the oil phase with metal sodium 54, the temperature is not so much raised because the heat capacity of water is large, ensuring that hydrogen can be stably produced. Of course, hydrogen is not burned because no oxygen is supplied in water.

FIG. 19 is a heating system diagram of a vegetable plant utilizing dashing hot spring water. A metal pipe 134 in which warm water as a secondary hot water 133 is circulated is stretched around a warm water passage or a warm water container 132 in which a primary hot water 131 as high-temperature spring water flows. The secondary hot water 133 is supplied by a circulating pump 19 for heating to raise the culture temperature in a soil 135 and a vegetable culturing house 136 in a tropical or subtropical vegetable plant and a waste warm water 137 dropped in temperature and discharged from the warm water container 132 is used as dashing hot spring water. Particularly, the temperature of a soil 135 and the temperature of a culture house 136 are computer-controlled by controlling the temperature of the secondary hot water 133 according to the date of sprouting, growing season or the time of harvesting. Also, in hot spring places in a cold district, a heavy snowfall area or the uplands, hot spring water is utilized to culture an asparagus, a sugarcane, corn or the like. Also, thermionic thermoelements 10 are disposed around the warm water container 132 and cold water 14 such as river water and melted snow is made to flow on the backside of the thermionic thermoelements 10 to carry out temperature-difference power generation and the generated electric power is utilized for illumination to conduct the photosynthesis in the culturing house 136. Because water and fertilizers are supplied, particularly, to the soil for the growth of vegetables, the use of a metal pipe 133 which is easily corroded is avoided and it is recommended to use a plastic pipe 138 such as a vinyl chloride pipe as the section of soil 135.

As explained above, according to the present invention, large electric power is efficiently produced from natural energies such as ocean tide and wind force or land wind force and sunlight. The obtained electric power ensures, for example, the following processes and production of products. Specifically, metal sodium can be produced at the site where sea water is collected and rock salt collecting site or salt collecting site of salt lakes. Also, fresh water, sodium, magnesium, calcium, potassium, caustic soda, chlorine, hydrochloric acid, sulfuric acid, hydrogen and oxygen and the like can be produced at the sea water collecting site. At the same time, unloaded malts, wood chips and the like are fermented to brew a deep sea water beer and bio-ethanol, carbon dioxide generated by this alcohol fermentation is used for photosynthesis to culture vegetables, and oxygen generated by the photosynthesis is supplied to a fish preserve and underwater reef where fish live to culture fishes and also returned to sea water reduced in the concentration of oxygen to thereby suppress the generation of a red tide. Namely, as mentioned above, the present invention so considers that environmental problems take precedence and the present invention can also, of course, reduce energy loss in the storage and transportation of products. Moreover, the energy efficiency of the whole system can be improved. Therefore, the effects of the present invention are not confined to the activation of the industries of the countries which depend on foreign countries for their resources but are extended over the activation of the energy economy of the world.

The present invention provides an integrated production factory in which, for example, effectively using electric power produced from an ocean tide and wind force on the sea water collecting site, fresh water, sodium, magnesium, calcium, potassium, caustic soda, chlorine, hydrochloric acid, sulfuric acid, hydrogen and oxygen and the like can be produced at the sea water collecting site, at the same time, unloaded malts, wood chips and the like are fermented to brew a deep sea water beer and bio-ethanol, carbon dioxide generated by this alcohol fermentation is used for photosynthesis to culture vegetables, and oxygen generated by the photosynthesis is supplied to a fish preserve and underwater reef where fish live to culture fishes and also returned to sea water reduced in the concentration of oxygen to thereby suppress the generation of a red tide, ensuring that in each section, products are united to effectively utilize their interactions. The integrated factory of the present invention is provided as a marine factory/cargo ship carrying on all of these productions, as a mother ship which stays at the site to continue productions or as a land factory adjacent to the coast or seashore. Then, in the integrated factory of the present invention, metal sodium is produced by the electric power obtained by using rock salts or salts in salt lakes and wind force power generation adjacent to the site where these salts are collected, or marine or land wind force power generation, and also, energy losses during production, storage and transportation are reduced and the efficiency of the whole system can be improved. This onsite integrated production factory is not restricted in its effect to the dissolution of the problems concerning worldwide exhaustion of resources and high cost of resources but produces an effect extended over economical production of clean and reproducible marine resources without using any fossil fuel, showing that the onsite integrated production factory of the present invention has a large industrial applicability.

What is claimed is:

1. An onsite integrated production factory comprising:
    an electrolytic plant having a means for producing and outputting at least fresh water, sodium, magnesium, calcium, caustic soda, chlorine, hydrochloric acid, sulfuric acid, hydrogen, and oxygen from raw materials comprising sea water, salt lake water or rock salt;
    an ethanol plant having a means for producing and outputting at least fuel bioethanol, alcohol drinks, and oxalic acid or sodium oxalate including a means for fermenting cellulose materials or grains using the fresh water, sulfuric acid or caustic soda produced by and received from the electrolytic plant,
    means for using the oxalic acid or sodium oxalate produced in and received from the ethanol plant as an agent for removing calcium contained in sea water in the electrolytic plant, and for generating and outputting carbon dioxide during the fermenting of the cellulose materials or grains;
    a vegetable plant having a means for producing vegetables by photosynthesis that generates and outputs oxygen and that receives and uses the carbon dioxide generated in the fermentation process in the ethanol plant, fresh water produced in the electrolytic plant, and sunlight or artificial light;
    a culturing plant having a fishery farm or underwater reef configured in a way such that fish are grown therein by having a means for introducing oxygen received from the vegetable plant into sea water to supplement a concentration of oxygen in the sea water or to suppress a generation of a red tide or by discharging the sea water supplemented with oxygen into sea water in the electrolytic plant; and
    a power generation unit configured in a way such that the power generation unit uses natural energy to generate energy supplied to at least one of the electrolytic plant, ethanol plant, vegetable plant, or culturing plant.

2. The onsite integrated production factory according to claim 1, wherein the power generation unit comprises temperature-difference power generation equipment comprising:
    a double or triple pipe structure having an inner and outer tube;
    semiconductor thermionic power generation elements arranged between said inner and outer tubes,
    wherein said temperature-difference power generation equipment is arranged to produce and output energy by having a means for circulating in said inner tube a heating medium selected from the group consisting of warm water circulated from solar heater pipes, high-temperature liquids of petroleum products, aromatic compounds, dissolved salts, easily meltable metals, silicone oil, sulfuric acid and oil, heated waste water from the electrolytic plant, and warm water circulation liquids selected from the group consisting of submarine hot spring, coastal hot spring, and a volcanic hot spring, and circulating in said outer tube cool water selected from the group consisting of pumped deep sea water, surface ocean water, and river water,
    wherein the means for circulating the heating medium includes a heat collecting pipe arranged to be heated by converging sunlight using a light converging means; and
    a cold filter or bandpass filter arranged to divide sunlight according to wavelength and supplied to the vegetable plant for photosynthesis, and
    wherein the vegetable plant has a means for receiving and using the sea water which has been subjected to the temperature-difference power generation equipment to cool a cold district farm room and a means for dividing the received sea water into two lines with a means for sending the deep sea water in one of the two lines for desalinization in the electrolytic plant to output desalinated water and received in the ethanol plant having a means for using desalinated water as a raw material for making beer or sake, and wherein the other line is arranged to discharge into a cold current fishery preserve or into the surface ocean water to form fisheries in the culturing plant.

3. The onsite integrated production factory according to claim 2, including a means for using the heating medium circulated in the heat collecting pipe as an auxiliary heat supply for heating molten salt in a molten salt electrolytic plant installed in the electrolytic plant.

4. The onsite integrated production factory according to claim 2, further comprising metal pipes for circulating secondary hot water around a periphery of a warm-water passage or a warm-water tank which flows a high-temperature hot spring water, having a means for supplying the secondary hot water to raise temperatures of a soil or to culture temperature in the vegetable plant, and to culture tropical or subtropical vegetables or for room heating.

5. The onsite integrated production factory according to claim 1, including means for generating and outputting carbon dioxide from fermentation of alcohol, and means for generating and outputting carbon monoxide including means for red-heating coking, and means for absorbing said carbon monoxide using caustic soda to thereby produce and output oxalic acid or oxalate soda in the ethanol plant, and wherein said electrolytic plant has a means for receiving and using said oxalic acid or oxalate soda to precipitate calcium oxalate to produce a filtrate, and a means for receiving and concentrating said filtrate using a reverse osmosis membrane or heater to produce sulfuric acid, and means for receiving and precipitating said calcium oxalate by pouring hydrochloric acid into the calcium oxalate to produce calcium chloride from said oxalic acid, and means for receiving and using said calcium chloride as a raw material for molten salt electrolysis used to produce metal calcium or as a catalyst for molten salt electrolysis to produce metal sodium.

6. The onsite integrated production factory according to claim 1, having a means for producing and introducing into a body of water the oxygen produced from said vegetable plant using an oxygen discharge pipe.

7. The onsite integrated production factory according to claim 1, having hydrogen producing equipment, wherein said hydrogen producing equipment has means for receiving and reacting said metal sodium produced in the electrolytic plant with water to produce hydrogen.

8. The onsite integrated production factory according to claim 7, wherein the hydrogen producing equipment comprises a reactor having an introduction port for metal sodium embraced in light gas oil or oils forming an oil phase and a water phase, a hydrogen discharge port, a nozzle and a tap configured in a way to supply water by spraying, instillation or pulse-wise addition at an upper part, a ultrasonic piezoelectric transducer around a periphery of said reactor, a discharge valve for an aqueous caustic soda solution at a bottom of said reactor, a control bar configured to push down metal sodium in the oil phase toward the water phase under the oil phase, a gas seal port and a hydrogen discharge port at an upper part of said reactor, and a jacket around the periphery of said reactor.

9. The onsite integrated production factory according to claim 1, wherein the electrolytic plant, the ethanol plant, the vegetable plant or the culturing plant is installed in a floating body vessel or drifting vessel of a multi- or mono-hull or a megafloat, a littoral structure or a structure on the land.

10. The onsite integrated production factory according to claim 1, wherein the power generation unit uses natural energy selected from the group consisting of wind power, hydraulic power, tidal power, sunlight, solar heat, or geothermal heat to produce said energy.

11. The onsite integrated production factory according to claim 1, comprising:

hydrogen power generation station where fresh water is added to the metal sodium produced in the electrolytic plant to produce hydrogen gas and caustic soda and the produced hydrogen gas is burnt for generating electricity; and sodium regenerating plant where the caustic soda is subjected to molten salt electrolysis to regenerate metal sodium, which is then transported to the hydrogen power generation station for producing hydrogen gas, which is used for generating electricity.

\* \* \* \* \*